(12) United States Patent
Nakata et al.

(10) Patent No.: US 7,954,856 B2
(45) Date of Patent: Jun. 7, 2011

(54) FLARELESS PIPE COUPLING STRUCTURE, FLARELESS PIPE COUPLING METHOD, AND ON-SITE PIPE COUPLING METHOD

(75) Inventors: Haruo Nakata, Sakai (JP); Takashi Shimamura, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 281 days.

(21) Appl. No.: 12/225,113

(22) PCT Filed: Mar. 30, 2007

(86) PCT No.: PCT/JP2007/057178
§ 371 (c)(1),
(2), (4) Date: Sep. 15, 2008

(87) PCT Pub. No.: WO2007/114360
PCT Pub. Date: Oct. 11, 2007

(65) Prior Publication Data
US 2009/0102191 A1 Apr. 23, 2009

(30) Foreign Application Priority Data

Mar. 31, 2006 (JP) .................................. 2006-099475

(51) Int. Cl.
*F16L 37/00* (2006.01)
(52) U.S. Cl. ......... 285/3; 285/249; 285/332.1; 285/342; 285/343
(58) Field of Classification Search .............. 285/3, 245, 285/249, 332.1, 342, 343
See application file for complete search history.

(56) References Cited

U.S. PATENT DOCUMENTS

| | | | | |
|---|---|---|---|---|
| 1,983,840 | A | * 12/1934 | Dohner | 285/341 |
| 2,460,621 | A | 2/1949 | Courtot | |
| 2,641,489 | A | * 6/1953 | Hedberg, Jr. | 285/3 |
| 2,791,452 | A | * 5/1957 | Watson | 285/342 |
| 3,006,558 | A | * 10/1961 | Jacobs | 239/267 |
| 3,069,188 | A | * 12/1962 | Crawford | 285/342 |
| 3,294,426 | A | * 12/1966 | Lyon | 285/341 |
| 3,736,008 | A | * 5/1973 | Crawford | 285/342 |
| 3,977,708 | A | 8/1976 | Jopp | |
| 4,022,497 | A | 5/1977 | Kotsakis | |
| 4,304,422 | A | * 12/1981 | Schwarz | 285/341 |
| 4,483,555 | A | * 11/1984 | Ludwig | 285/341 |
| 4,556,242 | A | * 12/1985 | Kowal et al. | 285/341 |

(Continued)

FOREIGN PATENT DOCUMENTS

CN 2483650 3/2002

(Continued)

*Primary Examiner* — David E Bochna
(74) *Attorney, Agent, or Firm* — Birch, Stewart, Kolasch & Birch, LLP.

(57) ABSTRACT

A guide tapered surface 17 of a pipe coupling port 16 has a small diameter portion 17a guiding to a distal end portion 3a of a bite type sleeve 3 to bite into a coupling pipe 5 and a large diameter portion 17b sealing a tapered outer circumferential surface 33 of the bite type sleeve 3 by making close contact with the tapered outer circumferential surface 33 of the bite type sleeve 3. A tilt angle α1 of the small diameter portion 17a relative to a central axis of the guide tapered surface 17 is greater than a tilt angle α2 of the large diameter portion 17b relative to the central axis. Therefore, even when a distal end portion of the coupling pipe 5 is not inserted up to an innermost portion of the pipe coupling port 16, excellent sealing performance is obtained in a portion coupled to the coupling pipe.

20 Claims, 20 Drawing Sheets

U.S. PATENT DOCUMENTS

| | | | |
|---|---|---|---|
| 4,586,731 A * | 5/1986 | Castrup | 285/341 |
| 5,074,599 A * | 12/1991 | Wirbel et al. | 285/341 |
| 7,104,079 B2 | 9/2006 | Kuwabara et al. | |
| 7,350,828 B2 * | 4/2008 | Williams | 285/3 |
| 2004/0066040 A1 | 4/2004 | Bennett et al. | |

FOREIGN PATENT DOCUMENTS

| | | |
|---|---|---|
| CN | 2535720 | 2/2003 |
| CN | 1464963 | 12/2003 |
| JP | 52-123321 | 9/1977 |
| JP | 60-86688 U | 6/1985 |
| JP | 2001-141169 A | 5/2001 |
| JP | 2003-74768 A | 3/2003 |
| JP | 2005-36947 A | 2/2005 |
| JP | 2005-246967 A | 9/2005 |
| JP | 2005-257127 A | 9/2005 |

* cited by examiner

FLARELESS PIPE COUPLING STRUCTURE, FLARELESS PIPE COUPLING METHOD, AND ON-SITE PIPE COUPLING METHOD

TECHNICAL FIELD

The present invention relates to a bite type pipe coupling structure, and to a pipe joint, a valve, a closing valve, a refrigerating cycle apparatus, and a hot-water supply apparatus each using the bite type pipe coupling structure. The present invention further relates to a bite type pipe coupling method and an on-site pipe coupling method.

BACKGROUND ART

In general, a pipe joint is detachable from a fluid pipe in order to easily execute replacement and repair of the fluid pipe. Pipe joints have various structures according to uses thereof.

For example, in a refrigerating cycle apparatus such as an air conditioner in which a refrigerant flows into a fluid pipe, a flare type pipe joint has been conventionally used. However, in recent years, in order to protect the global environment, as refrigerants of refrigerating cycle apparatuses have been switched from a conventional chlorofluorocarbon refrigerant to hydrocarbon (HC) refrigerants such as combustible propane, ethane, ethylene, n-pentane, n-butane, and isobutane or a natural refrigerant such as carbon dioxide used under a high pressure, a bite type pipe joint having a refrigerant leakage amount less than that of the flare type pipe joint and conventionally used for coupling of a steel pipe for conducting a high pressure fluid has been in the tendency to be used. Such a kind of bite type pipe joint is described in, for example, Patent Document 1 and Patent Document 2. The refrigerating cycle apparatuses include all kinds of apparatuses operated by a refrigerating cycle, for example, an air conditioner, a dehumidifier, a heat pump type hot-water supply apparatus, a refrigerator, a freezing apparatus, and a cooling apparatus for a manufacturing process.

FIGS. 26 and 27 show a bite type pipe joint described in Patent Document 1. As shown in FIGS. 26 and 27, the bite type pipe joint includes a joint main body 201, a fastening nut 202 as a fastening member, and a tubular bite type sleeve 203.

The joint main body 201 has a pipe coupling port 211 into which a distal end portion of a coupling pipe 204 is inserted. An external thread 212 is formed on an outer circumferential surface of the joint main body 201. A guide tapered surface 213 is formed in an opening end portion of the pipe coupling port 211. When the bite type sleeve 203 is pressed toward the pipe coupling port 211, an end portion (i.e. a front end portion 203a) of the bite type sleeve 203 that is adjacent to the joint main body 201 is guided toward a central axis of the coupling pipe 204 by the guide tapered surface 213.

The fastening nut 202 has a through hole 222 into which the coupling pipe 204 is inserted. A pressing tapered surface 223 for pressing an end portion (i.e. a rear end portion) of the bite type sleeve 203 that is adjacent to the fastening nut 202 is provided around the through hole 222. An internal thread 225 for being screwed onto the external thread 212 of the joint main body 201 is provided in an inner circumferential surface of the fastening nut 202.

The bite type sleeve 203 is disposed between the joint main body 201 and the fastening nut 202. The bite type sleeve 203 has a through hole 231 into which the coupling pipe 204 is inserted. The cross-sectional shape of the bite type sleeve 203 along the axis is substantially a rectangular shape formed long in the axial direction, as shown in FIG. 26. A pressure receiving tapered surface 232 contacting the pressing tapered surface 223 is formed in a rear end portion of the bite type sleeve 203. An axial pressing force from the fastening nut 202 acts on the pressure receiving tapered surface 232. A front end portion 203a of the bite type sleeve 203 can contact the guide tapered surface 213.

An assembling process of the bite type pipe joint having such a configuration is performed as follows. That is, first, the distal end portion of the coupling pipe 204 is inserted into the through hole 222 of the fastening nut 202 and the through hole 231 of the bite type sleeve 203, and the fastening nut 202 and the bite type sleeve 203 are assembled in the coupling pipe 204. Next, the distal end portion of the coupling pipe 204 is inserted into the pipe coupling port 211. At this time, the front end portion 203a of the bite type sleeve 203 is disposed to face the guide tapered surface 213 of the joint main body 201. Next, the internal thread 225 of the fastening nut 202 is screwed onto the external thread 212 of the joint main body 201, and the fastening nut 202 is fastened to the joint main body 201 with a predetermined torque using a fastening tool. Thereby, when the fastening nut 202 is fastened to the joint main body 201, the front end portion 203a of the bite type sleeve 203 is pressed on the guide tapered surface 213 by the fastening nut 202. The front end portion 203a of the bite type sleeve 203 is then pressed and bent toward a central axis of the coupling pipe 204 by the guide tapered surface 213. As a result, since the front end portion 203a bites into the coupling pipe 204, the coupling pipe 204 is prevented from being separated from the bite type sleeve 203 and space between the bite type sleeve 203 and the coupling pipe 204 is sealed. Further, since the front end portion 203a of the bite type sleeve 203 is pressed on the guide tapered surface 213, space between the bite type sleeve 203 and the joint main body 201 is also sealed. Accordingly, the bite type pipe joint exhibits a high sealing performance. FIG. 27 shows a state where the fastening nut 202 is fastened to the joint main body 201.

In the conventional bite type pipe joint, in a state where the distal end portion of the coupling pipe 204 is not inserted up to an innermost portion of the pipe coupling port 211, i.e. in a state where a gap L exists between a distal end surface of the coupling pipe 204 and the innermost portion of the pipe coupling port 211, the fastening nut 202 may be fastened to the joint main body 201. In this case, when the fastening nut 202 is fastened to the joint main body 201, the front end portion 203a of the bite type sleeve 203 is pressed and bent toward the central axis of the coupling pipe 204 and bites into the coupling pipe 204 and thus the coupling pipe 204 moves to a direction indicated by a blank arrow A of FIG. 26. Accordingly, since the front end portion 203a of the bite type sleeve 203 does not sufficiently bite into the coupling pipe 204, sealing performance may be insufficient in a portion coupled to the coupling pipe 204. This problem may also occur in a pipe joint used in apparatuses other than a refrigerating cycle apparatus such as an air conditioner.

Patent Document 1: Japanese Laid-Open Patent Publication No. 2003-74768
Patent Document 2: Japanese Laid-Open Patent Publication No. 2005-36947

DISCLOSURE OF THE INVENTION

An objective of the present invention is to provide a bite type pipe coupling structure that obtains excellent sealing performance in a portion coupled to a coupling pipe even when a distal end portion of the coupling pipe which should be coupled is not inserted up to an innermost portion of a pipe coupling port. Another objective of the present invention is to provide a pipe joint, a valve, a closing valve, a refrigerating cycle apparatus, a bite type pipe coupling method, and an on-site pipe coupling method using such a bite type pipe coupling structure.

In order to achieve the above-mentioned objectives, according to a first aspect of the present invention, there is provided a bite type pipe coupling structure including a joint main body having a pipe coupling port into which a coupling pipe is inserted, a tubular bite type sleeve fitted to an outer circumference of the coupling pipe, and a fastening member fastened to the joint main body so as to press the bite type sleeve toward the inside of the joint main body. An outer circumferential surface of the bite type sleeve is a tapered outer circumferential surface, the diameter of which decreases toward the inside of the joint main body. A guide tapered surface, the diameter of which increases toward the fastening member, is provided in a portion of the pipe coupling port that is adjacent to the fastening member. The bite type sleeve can contact the guide tapered surface. The guide tapered surface has a small diameter portion guiding to cause a distal end portion of the bite type sleeve to bite into the coupling pipe and a large diameter portion sealing the tapered outer circumferential surface of the bite type sleeve by making close contact with the tapered outer circumferential surface. A tilt angle of the small diameter portion relative to a central axis of the guide tapered surface is greater than that of the large diameter portion relative to the central axis.

According to the above-described configuration, since the tilt angle of the small diameter portion is relatively large, the distal end portion of the bite type sleeve bites into the coupling pipe with a relatively large biting angle (a biting angle indicates an angle of the distal end portion of the bite type sleeve relative to a central axis of the bite type sleeve when the bite type sleeve bites). Accordingly, the force pressing the coupling pipe toward the innermost portion of the pipe coupling port decreases. As a result, even when the distal end portion of the coupling pipe is not inserted up to the innermost portion of the pipe coupling port, the coupling pipe is suppressed from moving toward the innermost portion of the pipe coupling port by fastening the fastening member and thus excellent sealing performance is obtained in a portion coupled to the coupling pipe. Further, after the distal end portion of the bite type sleeve bites into the coupling pipe by a necessary amount, the tapered outer circumferential surface of the bite type sleeve makes close contact with the large diameter portion of the guide tapered surface, and thus the tapered outer circumferential surface and the large diameter portion make close contact without difficulty. In addition, since the large diameter portion with which the tapered outer circumferential surface of the bite type sleeve makes close contact is a portion in which a tilt angle relative to the central axis is relatively small among the guide tapered surface, a large pressing force is unnecessary for making close contact with the tapered outer circumferential surface and the large diameter portion, and a close contact area of the tapered outer circumferential surface and the large diameter portion increases. Therefore, while the biting amount of the distal end portion of the bite type sleeve is sufficiently secured, the tapered outer circumferential surface of the bite type sleeve and the guide tapered surface of the joint main body surely make close contact, and sealing performance is improved in a portion coupled to the coupling pipe.

In the above-described bite type pipe coupling structure, it is preferable that the guide tapered surface has an intermediate portion between the small diameter portion and the large diameter portion, and a tilt angle of the intermediate portion relative to the central axis of the guide tapered surface is smaller than those of the small diameter portion and the large diameter portion. In this case, by adjusting the size of the intermediate portion, the amount in which the distal end portion of the bite type sleeve bites into the coupling pipe is changed until the tapered outer circumferential surface and the large diameter portion of the guide tapered surface make close contact. That is, the intermediate portion can be used as means for adjusting the biting amount of the bite type sleeve.

According to a second aspect of the present invention, there is provided a bite type pipe coupling structure including a joint main body having a pipe coupling port into which a coupling pipe is inserted, a tubular bite type sleeve fitted to an outer circumference of the coupling pipe, and a fastening member fastened to the joint main body so as to press the bite type sleeve toward the inside of the joint main body. An outer circumferential surface of the bite type sleeve is a tapered outer circumferential surface, the diameter of which decreases toward the inside of the joint main body. A guide tapered surface, the diameter of which increases toward the fastening member, is provided in a portion of the pipe coupling port that is adjacent to the fastening member. The bite type sleeve can contact the guide tapered surface. The bite type sleeve has a distal end portion adjacent to the inside of the joint main body and a rear side portion far from the inside of the joint main body. A tilt angle of the tapered outer circumferential surface in the distal end portion relative to a central axis of the bite type sleeve is smaller than that of the guide tapered surface relative to a central axis of the guide tapered surface. A tilt angle of the tapered outer circumferential surface in the rear side portion relative to the central axis of the bite type sleeve is greater than that of the tapered outer circumferential surface in the distal end portion relative to the central axis of the bite type sleeve and is smaller than that of the guide tapered surface relative to the central axis of the guide tapered surface. The outer diameter of the rear side portion is greater than the outer diameter of the distal end portion, and a step is provided between the distal end portion and the rear side portion.

According to the above-described configuration, since the tilt angle of the guide tapered surface is greater than that of the tapered outer circumferential surface of the bite type sleeve at its distal end portion, the distal end portion of the bite type sleeve bites into the coupling pipe with a relatively large biting angle. Accordingly, the force pressing the coupling pipe toward the innermost portion of the pipe coupling port decreases. As a result, even when the distal end portion of the coupling pipe is not inserted up to the innermost portion of the pipe coupling port, the coupling pipe is suppressed from moving toward the innermost portion of the pipe coupling port by fastening the fastening member and thus excellent sealing performance is obtained in a portion coupled to the coupling pipe. Further, after the distal end portion of the bite type sleeve bites into the coupling pipe by a necessary amount, the tapered outer circumferential surface of the bite type sleeve makes close contact with the guide tapered surface, and thus the tapered outer circumferential surface and the guide tapered surface make close contact without difficulty. Therefore, while the biting amount of the distal end portion of the bite type sleeve is sufficiently secured, the tapered outer circumferential surface of the bite type sleeve and the guide tapered surface of the joint main body surely make close contact, and sealing performance is improved in a portion coupled to the coupling pipe. By adjusting the tilt angle or the axial length of the distal end portion of the bite type sleeve or the size of the step, the amount in which the distal end portion of the bite type sleeve bites into the coupling pipe is changed until the tapered outer circumferential surface and the guide tapered surface make close contact.

In the above-described bite type pipe coupling structure, it is preferable that the bite type sleeve is formed integrally with the fastening member, and the bite type sleeve is separated from the fastening member by an axial pressing force from the fastening member before the bite type sleeve bites into the coupling pipe. In this case, since the bite type sleeve is formed integrally with the fastening nut, the number of parts decreases and the cost of managing parts decreases. Further, since it is unnecessary to fit the bite type sleeve to an outer circumference of the coupling pipe or mount the bite type sleeve to the pipe coupling port, the workability is improved.

In the above-described bite type pipe coupling structure, it is preferable that the fastening member is a fastening nut screwed to the joint main body, and the bite type sleeve is connected to an inner wall of the fastening nut through a thin connection to be formed integrally with the fastening nut. In this case, by fastening the fastening nut, the bite type sleeve is separated from the fastening nut. Further, in this case, the fastening nut can bite into the coupling pipe without rotating the bite type sleeve. Therefore, sealing performance is improved in a portion coupled to the coupling pipe.

In the above-described bite type pipe coupling structure, it is preferable that the bite type sleeve is formed integrally with the joint main body, and the bite type sleeve is separated from the joint main body by an axial pressing force from the fastening member. In this case, since the bite type sleeve is formed integrally with the joint main body, the number of parts decreases and the cost of managing parts decreases. Further, since it is unnecessary to fit the bite type sleeve to an outer circumference of the coupling pipe or mount the bite type sleeve to the pipe coupling port, the workability is improved.

In the above-described bite type pipe coupling structure, it is preferable that the fastening member is a fastening nut screwed to the joint main body, and the bite type sleeve is joined to the pipe coupling port of the joint main body at a joint surface, which is substantially parallel to the central axis of the bite type sleeve, to be formed integrally with the joint main body. A method of bonding the bite type sleeve to the pipe coupling port includes, for example, adhesion or engagement. Since the bite type sleeve is formed integrally with the joint main body in a state exposed outside of the joint main body, careful treatment is required.

According to a third aspect of the present invention, there is provided a pipe joint having at least two pipe coupling portions extended in different directions. The above-described bite type pipe coupling structure is used in at least one of the pipe coupling portions. In this case, fluid is suppressed from being leaked from the pipe coupling portions, and the workability when coupling pipes is improved.

According to a fourth aspect of the present invention, there is provided a pipe joint having two pipe coupling portions extended in different directions. The above-described bite type pipe coupling structure is used in one of the two pipe coupling portions and a pipe is coupled to the other of the two pipe coupling portions by brazing. This configuration is suitable for detachably coupling a pipe to one pipe coupling portion.

According to a fifth aspect of the present invention, there is provided a pipe joint having two pipe coupling portions extended in different directions. The above-described bite type pipe coupling structure is used in the two pipe coupling portions. This configuration is suitable for detachably coupling a pipe to each of the two pipe coupling portions.

In the above-described pipe joint, it is preferable that coupling pipes having different diameters are coupled to pipe coupling portions extended in different directions. This configuration is suitable for coupling pipes having different diameters.

According to a sixth aspect of the present invention, there is provided a valve having at least one pipe coupling portion. The above-described bite type pipe coupling structure is used in the pipe coupling portion. In this case, leakage from the pipe coupling portion is suppressed, and the workability when coupling a pipe is improved.

According to a seventh aspect of the present invention, there is provided a closing valve having at least one pipe coupling portion. The above-described bite type pipe coupling structure is used in the pipe coupling portion. In this case, leakage from the pipe coupling portion is suppressed, and the workability when coupling a pipe is improved.

According to an eighth aspect of the present invention, there is provided a refrigerating cycle apparatus having a refrigerant circuit. In the refrigerant circuit, at least one pipe coupling portion to which a refrigerant pipe is detachably coupled is provided. The above-described bite type pipe coupling structure is used in the pipe coupling portion. In this case, a refrigerant is suppressed from being leaked from a portion coupled to the refrigerant pipe, and the workability when coupling the pipe is improved.

In the above-described refrigerating cycle apparatus, it is preferable that a refrigerant circulating in the refrigerant circuit is a high pressure gas refrigerant. For example, when carbon dioxide and the like is used as refrigerant, a gas pressure within the refrigerant pipe increases. Thus, a pipe coupling structure having less leakage of the refrigerant is required. According to the present invention, even in such a case, the reliability of the apparatus is improved.

In the above-described refrigerating cycle apparatus, it is preferable that a refrigerant circulating in the refrigerant circuit is a hydrocarbon refrigerant. For example, when a combustible refrigerant like a hydrocarbon refrigerant such as propane is used, a pipe coupling structure having less leakage of the refrigerant is required. According to the present invention, even in such a case, the reliability of the apparatus is improved.

In the above-described refrigerating cycle apparatus, it is preferable that the refrigerating cycle apparatus is operated by a supercritical refrigeration cycle. In the refrigerating cycle apparatus operated by a supercritical refrigeration cycle, a refrigerant gas pressure within the refrigerant pipe increases. Thus, a pipe coupling structure having less leakage of the refrigerant is required. According to the present invention, even in such a case, the reliability of the apparatus is improved.

In the above-described refrigerating cycle apparatus, it is preferable that the refrigerating cycle apparatus is a heat pump type hot-water supply apparatus. In the heat pump type hot-water supply apparatus, in order to supply high temperature water for hot-water supply, a refrigerant gas pressure within the refrigerant pipe increases. Thus, a pipe coupling structure having less leakage of the refrigerant is required. According to the present invention, even in such a case, the reliability of the apparatus is improved.

According to a ninth aspect of the present invention, there is provided a hot-water supply apparatus having a circuit in which water for hot-water supply circulates. A pipe coupling portion using the above-described bite type pipe coupling structure is provided in the circuit. In many cases, a piping of water for hot-water supply is constructed on-site. In this regard, by using the bite type pipe coupling structure, leakage from the pipe coupling portion is suppressed, and the workability is improved.

According to a tenth aspect of the present invention, there is provided a method of bite type pipe coupling of a pipe joint having a pipe coupling portion in which the above-described bite type pipe coupling structure is used. The method includes assembling the fastening member and the bite type sleeve in the coupling pipe and then inserting an end portion of the coupling pipe into the pipe coupling port of the joint main body, causing the distal end portion of the bite type sleeve to contact the guide tapered surface of the joint main body, causing the distal end portion of the bite type sleeve to bite into the coupling pipe by fastening the fastening member, and causing the tapered outer circumferential surface of the bite type sleeve to make close contact with the guide tapered surface by pressing the tapered outer circumferential surface of the bite type sleeve against the guide tapered surface.

According to the above-described method, after the distal end portion of the bite type sleeve bites into the coupling pipe, the tapered outer circumferential surface of the bite type sleeve makes close contact with the guide tapered surface by pressing the tapered outer circumferential surface of the bite type sleeve to the guide tapered surface. Accordingly, even when the distal end portion of the coupling pipe is not inserted up to the innermost portion of the pipe coupling port, excellent sealing performance is obtained in a portion coupled to the coupling pipe. Further, the tapered outer circumferential surface and the guide tapered surface surely make close contact while sufficiently securing a biting amount of the bite type sleeve.

According to an eleventh aspect of the present invention, there is provided an on-site pipe coupling method including performing a pipe construction on-site by applying the above-described bite type pipe coupling method. In this case, leakage from the pipe coupling portion is suppressed, and the workability is improved.

BEST MODE FOR CARRYING OUT THE INVENTION

First Embodiment

A bite type pipe joint using a bite type pipe coupling structure according to a first embodiment of the present invention is described hereinafter with reference to FIGS. 1 to 10.

Figure 1:
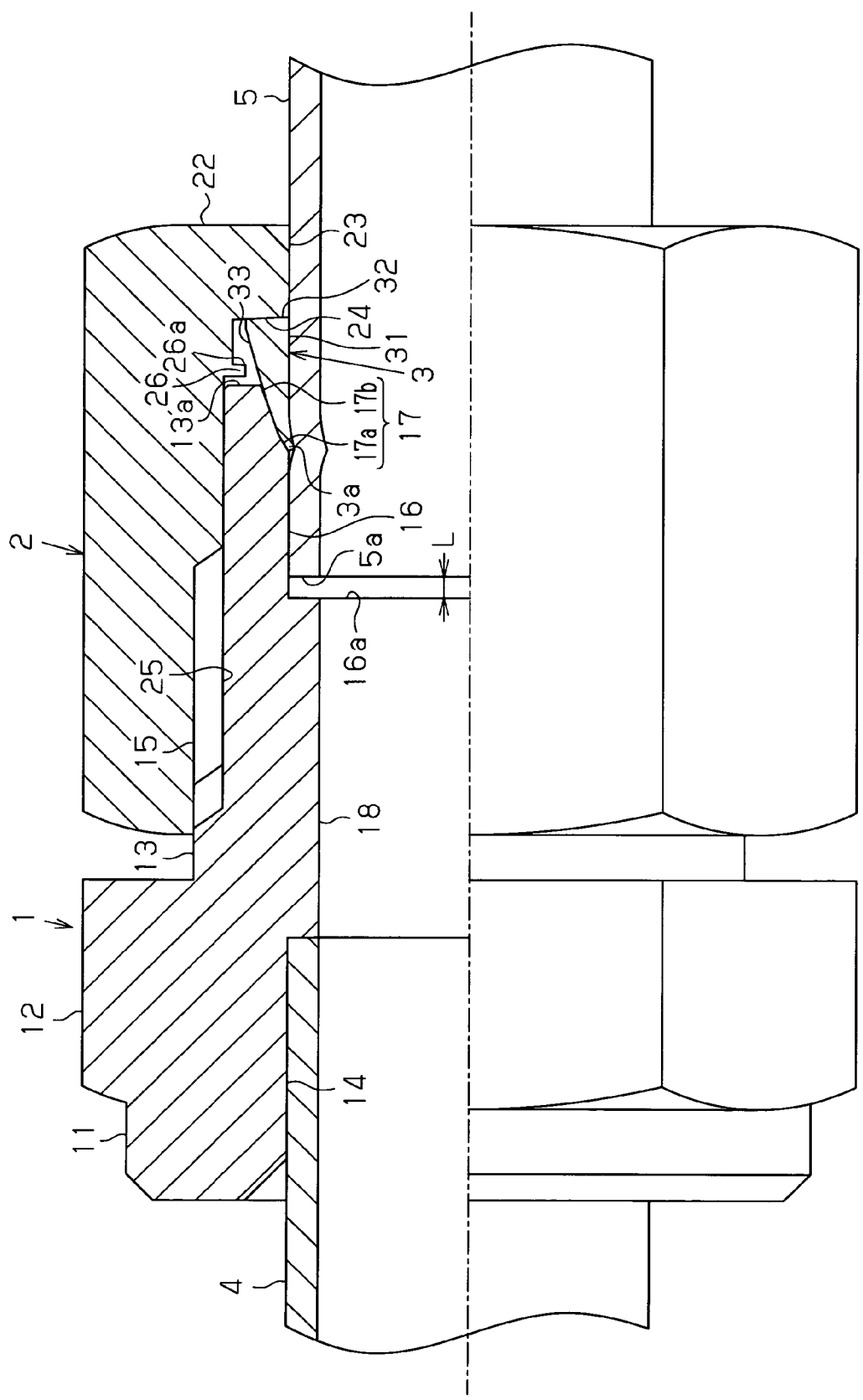
FIG. 1 is a partial cross-sectional view illustrating a coupling state of a bite type pipe joint according to a first embodiment of the present invention.
Figure 2:
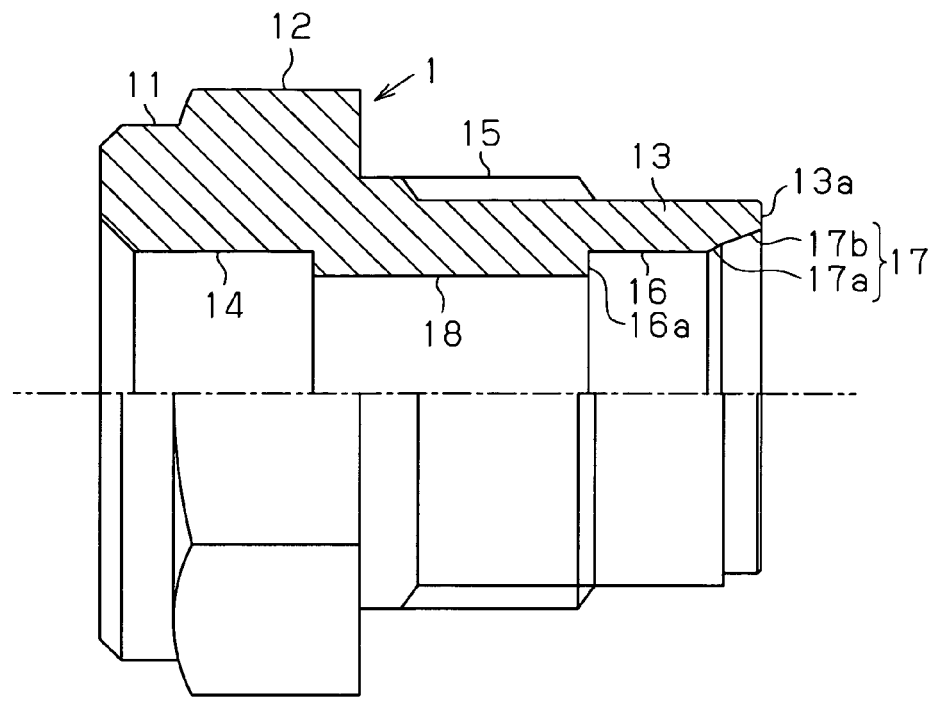
FIG. 2 is a partial cross-sectional view of a joint main body of the pipe joint of FIG. 1.
Figure 3:
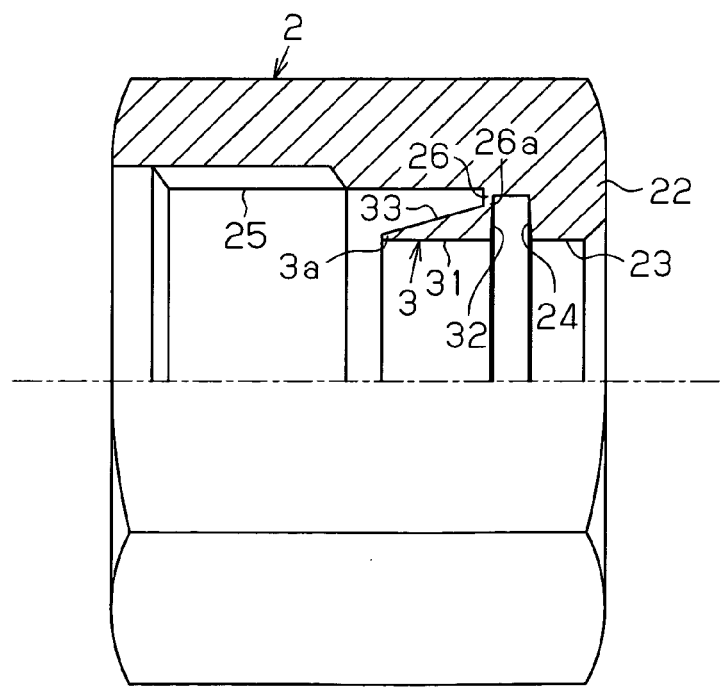
FIG. 3 is a partial cross-sectional view of a fastening nut of the pipe joint of FIG. 1.

The bite type pipe joint according to the present embodiment is used for coupling a refrigerant pipe, which is made of copper, for a refrigerating cycle apparatus. The bite type pipe joint has a pipe coupling portion to which a pipe is detachably coupled, and the bite type pipe coupling structure is used in the pipe coupling portion. The bite type pipe joint is made of a copper alloy having hardness greater than a copper pipe. As shown in FIGS. 1 to 3, the bite type pipe joint has a joint main body 1, a fastening nut 2 as a fastening member, and a tubular bite type sleeve 3. In the bite type pipe joint, a fixed pipe 4 made of copper is coupled to a base end portion of the joint main body 1, i.e. to an end portion facing away from the fastening nut 2, and a coupling pipe 5 made of copper is detachably coupled to a coupling end portion of the joint main body 1, i.e. to an end portion adjacent to the fastening nut 2. In general, the fixed pipe 4 is not intended to be detached from the joint main body 1.

The joint main body 1 includes a socket 11, a nut 12, and the pipe coupling portion 13. In a state where the fixed pipe 4 is inserted into the socket 11, they are brazed to each other. The nut 12 has an external shape that can easily hold the joint main body 1 when the fastening nut 2 is fastened. The coupling pipe 5 is detachably coupled to the pipe coupling portion 13 through the fastening nut 2.

A pipe coupling port 14 for inserting an end portion of the fixed pipe 4 is formed in the socket 11 and the nut 12. A distal end portion of the fixed pipe 4 is disposed and coupled to the pipe coupling port 14. The fixed pipe 4 is brazed to the pipe coupling port 14 in a state contacting an innermost portion of the pipe coupling port 14.

An external thread 15 for being screwed into the fastening nut 2 is formed in an outer circumferential surface of the pipe coupling portion 13. A pipe coupling port 16 for inserting a distal end portion of the coupling pipe 5 is formed in the pipe coupling portion 13. The distal end portion of the coupling pipe 5 is disposed and detachably coupled to the pipe coupling port 16. A guide tapered surface 17 is formed in an end portion of the pipe coupling port 16 that is adjacent to the fastening nut 2 (see FIG. 4). The diameter of the guide tapered surface 17 increases toward the fastening nut 2. As a distal end portion 3a of the bite type sleeve 3 is guided to bite into the coupling pipe 5 by the guide tapered surface 17, the coupling pipe 5 is fixed, and space between the bite type sleeve 3 and the coupling pipe 5 is sealed. Further, as a tapered outer circumferential surface 33 of the bite type sleeve 3 makes close contact with the guide tapered surface 17, space between the bite type sleeve 3 and the joint main body 1 is sealed.

A through hole 23 for receiving the coupling pipe 5 is formed at the center of a side wall 22 of the fastening nut 2. An inner wall surface of the side wall 22 functions as a pressing surface 24 for pressing the bite type sleeve 3. An internal thread 25 for being screwed onto the external thread 15 of the joint main body 1 is formed in an inner circumferential surface of the fastening nut 2. The bite type sleeve 3 formed integrally with the fastening nut 2 is disposed in the fastening nut 2.

Figure 5:
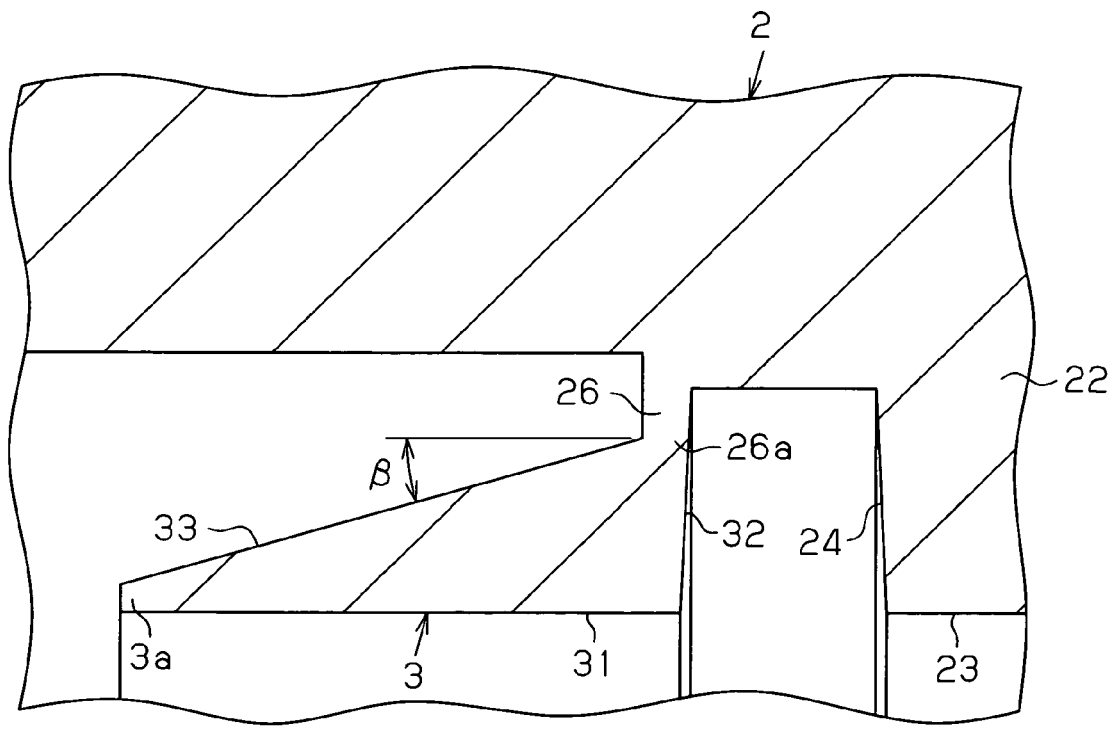
FIG. 5 is an enlarged view of FIG. 3 showing near a bite type sleeve.

The bite type sleeve 3 has a through hole 31 for fitting the coupling pipe 5 and is fitted to an outer circumference of the coupling pipe 5 (see FIG. 5). A rear end surface of the bite type sleeve 3 is a pressure receiving surface 32 that contacts the pressing surface 24 of the fastening nut 2. An outer circumferential surface of the bite type sleeve 3 is the tapered outer circumferential surface 33, which is inclined by an angle β relative to a center line of the bite type sleeve 3. The diameter of the tapered outer circumferential surface 33 decreases toward the inside of the joint main body 1. The tilt angle β is set to an angle in which the distal end portion 3a of the bite type sleeve 3 can be bent by a small force and in which the distal end portion 3a is not inserted between the coupling pipe 5 and the pipe coupling portion 13 without biting into the coupling pipe 5. Specifically, it is preferable that the tilt angle β is set so that the value of β/α2 is in a range of 0.5 to 1.0. The value α2 is a tilt angle of a large diameter portion 17b to be described later of the guide tapered surface 17. In the present embodiment, as the tilt angle β is set to 15°, the thickness of the distal end portion 3a of the bite type sleeve 3 is set to about 0.1 to 0.5 mm when the outer diameter of the coupling pipe 5 is 9.52 mm.

As shown in FIG. 5, the fastening nut 2 and the bite type sleeve 3 are integrally formed to be connected to each other by a thin connection 26 provided between the fastening nut 2 and the bite type sleeve 3 around the pressure receiving surface 32. The thin connection 26 has a thinnest portion 26a coupled to the tapered outer circumferential surface 33. The thickness of the thinnest portion 26a is set to be sheared by the force pressing the bite type sleeve 3 in an axial direction of the bite type sleeve 3, generated when the fastening nut 2 is fastened to the joint main body 1 using a fastening tool. In addition, an inner circumferential surface of the fastening nut 2 between the thin connection 26 and the pressing surface 24 has a diameter greater than a greatest outer diameter portion of the tapered outer circumferential surface 33 so that the bite type sleeve 3 separated from the fastening nut 2 approaches and contacts the pressing surface 24 of the side wall 22 of the fastening nut 2.

Figure 4:
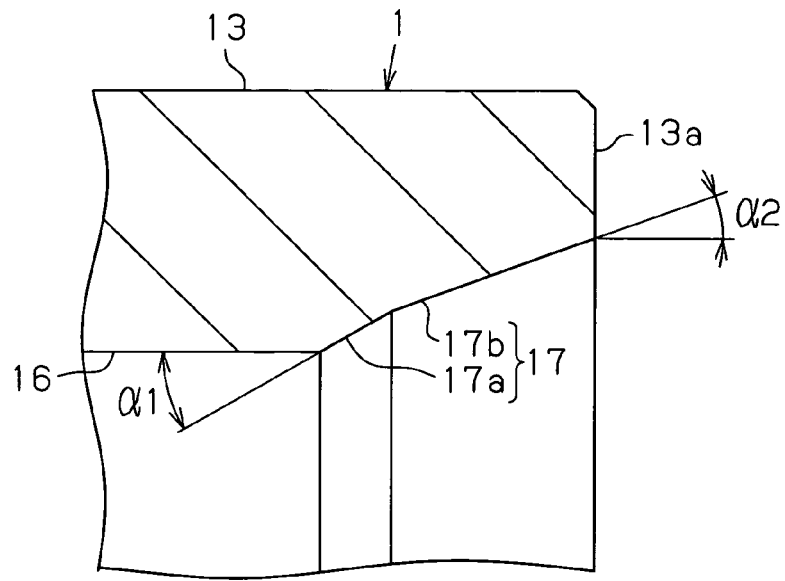
FIG. 4 is an enlarged view of FIG. 2 showing near a guide tapered surface.

The guide tapered surface 17 of the joint main body 1 is described in detail with reference to FIG. 4.

The guide tapered surface 17 has a small diameter portion 17a guiding the distal end portion 3a of the bite type sleeve 3 to bite into the coupling pipe 5 and a large diameter portion 17b making close contact with the tapered outer circumferential surface 33 of the bite type sleeve 3 in order to seal between the bite type sleeve 3 and the joint main body 1. The small diameter portion 17a is inclined to an angle α1 relative to a central axis. The large diameter portion 17b is inclined to an angle α2 relative to the central axis. In order to increase a biting angle of the distal end portion 3a of the bite type sleeve 3 relative to the coupling pipe 5, the tilt angle α1 of the small diameter portion 17a is set to be greater than the tilt angle α2 of the large diameter portion 17b. However, if the tilt angle α1 is too great, there is a problem that a force necessary for bending the distal end portion 3a of the bite type sleeve 3 excessively increases. Specifically, it is preferable that the tilt angle α1 is 25° to 35°, and it is more preferable that the tilt angle α1 is 30° to 35°. Also, it is preferable that the tilt angle α2 is 15° to 25°, and it is more preferable that the tilt angle α2 is 20° to 25°. It is preferable that a bending portion of the distal end portion 3a contacts the small diameter portion 17a when the distal end portion 3a of the bite type sleeve 3 bites to the coupling pipe 5. Further, when the distal end portion 3a bites into the coupling pipe 5 by a predetermined amount, the tapered outer circumferential surface 33 contacts the large diameter portion 17b, whereby the bite type sleeve 3 is preferably deformed. If the tapered outer circumferential surface 33 contacts the large diameter portion 17b before the distal end portion 3a bites into the coupling pipe 5 by the predetermined amount, biting of the distal end portion 3a to the coupling pipe 5 may not be enough and thus the bite type sleeve 3 may be little deformed.

The bite type pipe coupling structure according to the first embodiment is a structure for coupling the coupling pipe 5 and specifically, includes the joint main body 1, the fastening nut 2, and the bite type sleeve 3.

Next, a method of coupling the coupling pipe 5 using the bite type pipe joint having the above-described bite type pipe coupling structure is described with reference to FIGS. 6(a) to 8. In the following description, the fixed pipe 4 is previously coupled to the joint main body 1 by brazing. A distal end 5a of the coupling pipe 5 does not contact an innermost portion 16a of the pipe coupling port 16, and a gap L exists between the distal end 5a of the coupling pipe 5 and the innermost portion 16a of the pipe coupling port 16.

Figure 6A:
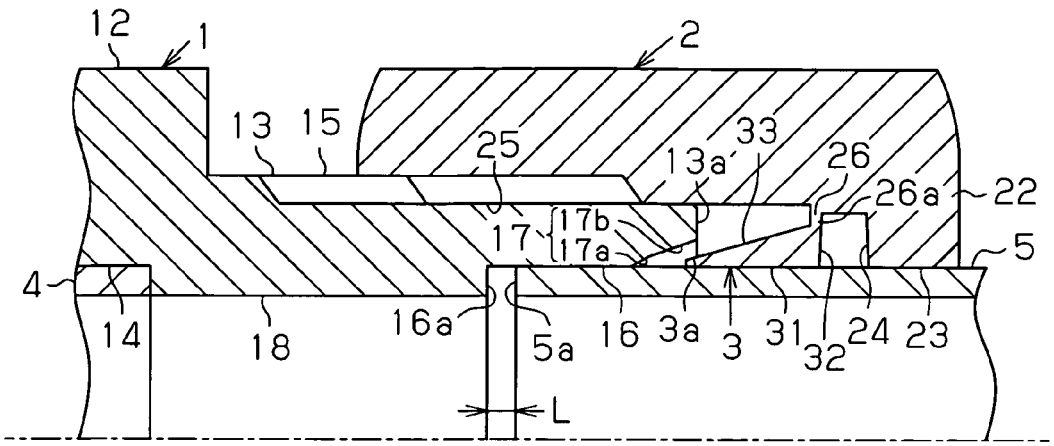
FIG. 6(a) is a partial cross-sectional view of the pipe joint of FIG. 1, illustrating a state when a coupling pipe is inserted into a pipe coupling port and a fastening nut starts being fastened.

As shown in FIG. 6(a), first, a distal end portion of the coupling pipe 5 is inserted into the through hole 23 of the fastening nut 2 and the through hole 31 of the bite type sleeve 3, and thus the fastening nut 2 and the bite type sleeve 3 are assembled in the coupling pipe 5. Next, the distal end portion of the coupling pipe 5 is inserted into the pipe coupling port 16 of the pipe coupling portion 13. At this time, the distal end 5a of the coupling pipe 5 does not contact the innermost portion 16a of the pipe coupling port 16. That is, the gap L is formed between the distal end 5a of the coupling pipe 5 and the innermost portion 16a of the pipe coupling port 16.

Figure 6B:
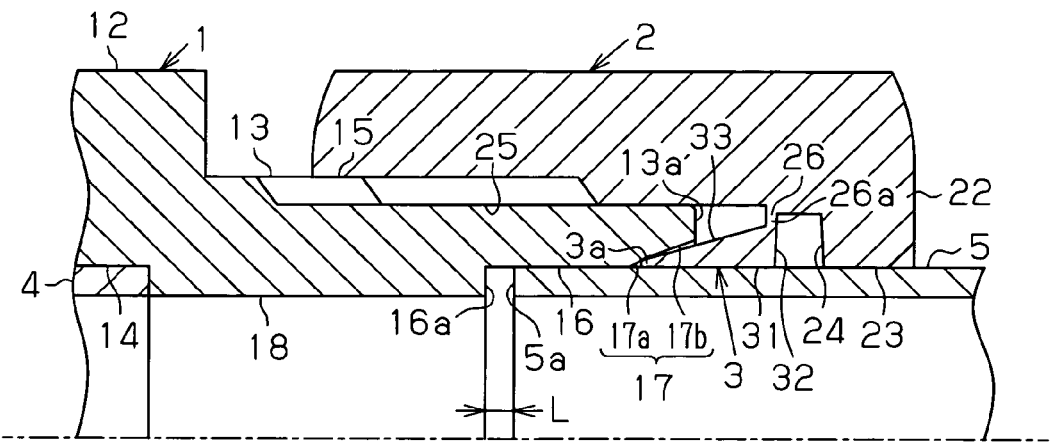
FIG. 6(b) is a partial cross-sectional view of the pipe joint of FIG. 1, illustrating a state when fastening the fastening nut until a distal end portion of the bite type sleeve contacts the guide tapered surface.

Next, the fastening nut 2 is threaded and fastened to the joint main body 1, and the distal end portion 3a of the bite type sleeve 3 formed integrally with the fastening nut 2 contacts the guide tapered surface 17, as shown in FIG. 6(b). In this state, since the force pressing toward the innermost portion 16a of the pipe coupling port 16 does not yet acts on the coupling pipe 5, the size of the gap L is not changed.

Thereafter, the fastening nut 2 is further fastened, and the thinnest portion 26a of the thin connection 26 is sheared by an axial pressing force from the fastening nut 2 and the bite type sleeve 3 is separated from the fastening nut 2.

Figure 7A:
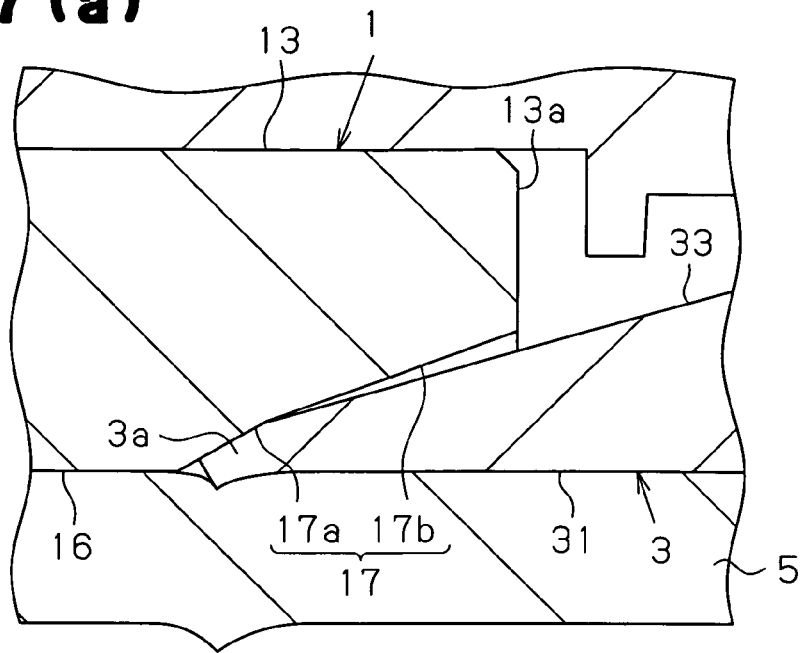
FIG. 7(a) is a partial cross-sectional view of the pipe joint of FIG. 1, illustrating a state when the distal end portion of the bite type sleeve bites by a predetermined amount.

Thereafter, the fastening nut 2 is further fastened, and the pressing surface 24 of the fastening nut 2 contacts the pressure receiving surface 32 of the bite type sleeve 3. As the pressure receiving surface 32 of the bite type sleeve 3 is pressed by the pressing surface 24 of the fastening nut 2, before the tapered outer circumferential surface 33 of the bite type sleeve 3 contacts an inner circumferential surface of the large diameter portion 17b of the guide tapered surface 17, the distal end portion 3a of the bite type sleeve 3 first bites into the coupling pipe 5 by a predetermined amount, as shown in FIG. 7(a). At this time, since the force pressing toward the innermost portion 16a of the pipe coupling port 16 acts on the coupling pipe 5, the size of the gap L decreases. However, since the tilt angle α1 of the small diameter portion 17a is set to be relatively large, a biting angle of the distal end portion 3a of the bite type sleeve 3 is relatively large, and thus movement of the coupling pipe 5 is suppressed to be small.

Figure 7B:
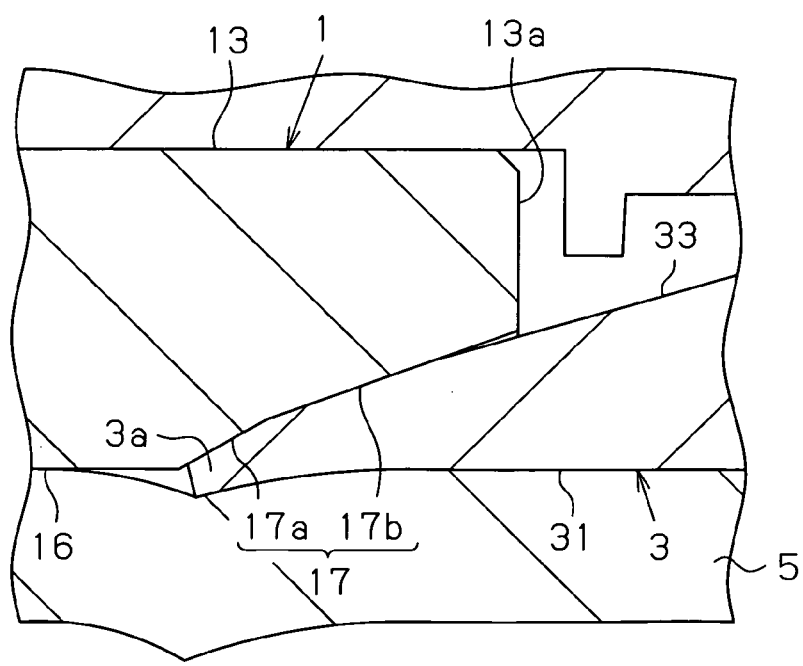
FIG. 7(b) is a partial cross-sectional view of the pipe joint of FIG. 1, illustrating a state when biting of the distal end portion of the bite type sleeve is fully completed.

When the fastening nut 2 is further fastened in a state of FIG. 7(a), the bite type sleeve 3 is deformed so that the tapered outer circumferential surface 33 makes close contact with the large diameter portion 17b while biting of the distal end portion 3a of the bite type sleeve 3 is deepened, as shown in FIG. 7(b). Thereby, coupling of the coupling pipe 5 to the joint main body 1 is completed. Since the tilt angle α2 of the large diameter portion 17b is set to be relatively small, an area of the large diameter portion 17b making close contact with the tapered outer circumferential surface 33 relatively largely increases.

Figure 8:
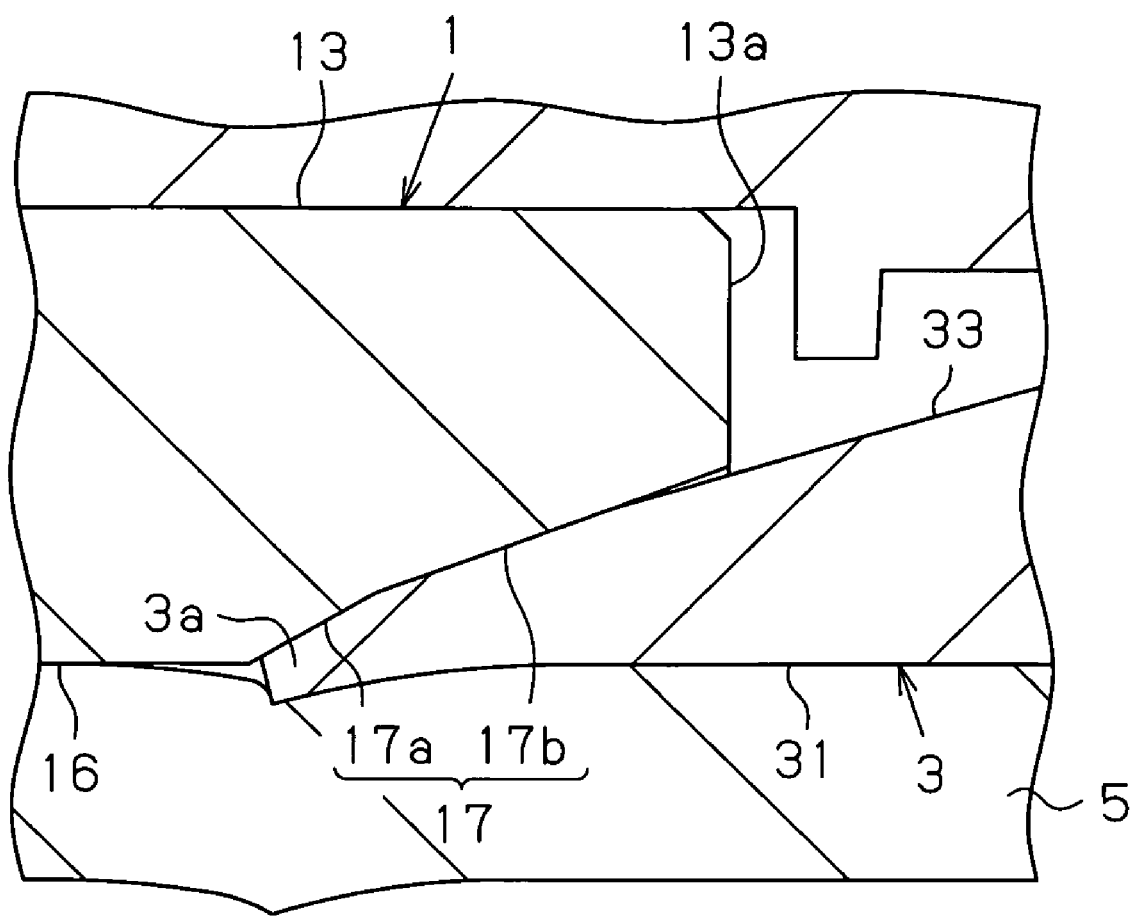
FIG. 8 is a partial cross-sectional view of a modification of the pipe joint of FIG. 1, illustrating a state when biting of the distal end portion of the bite type sleeve is fully completed.

Further, if the hardness of the bite type sleeve 3 is substantially equal to that of the coupling pipe 5, the distal end portion 3a of the bite type sleeve 3 bites into the coupling pipe 5, and thus the coupling pipe 5 is relatively largely deformed, as shown in FIG. 7(b). If the hardness of the bite type sleeve 3 is greater than that of the coupling pipe 5, deformation of the coupling pipe 5 becomes relatively small when the distal end portion 3a of the bite type sleeve 3 bites into the coupling pipe 5, as shown in FIG. 8.

Figure 6C:
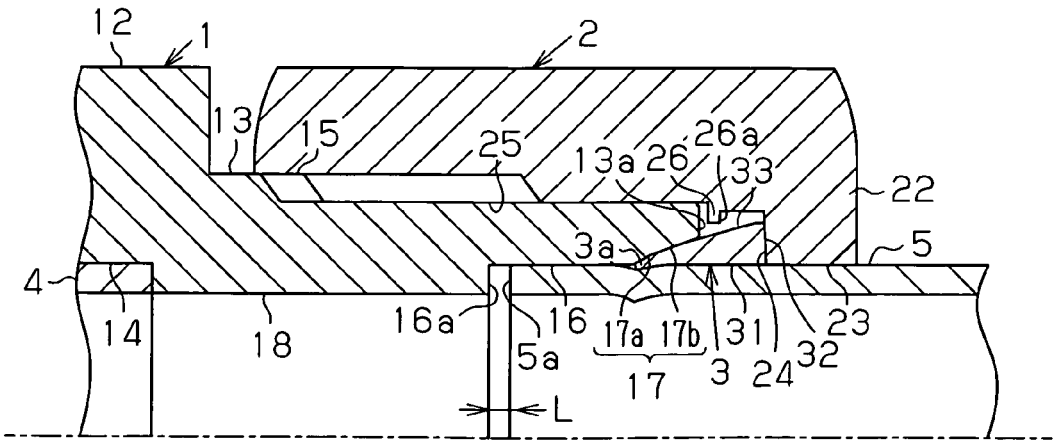
FIG. 6(c) is a partial cross-sectional view of the pipe joint of FIG. 1, illustrating a state when fastening of the fastening nut is fully completed.

In any case, as shown in FIG. 6(c), the tapered outer circumferential surface 33 of the bite type sleeve 3 makes close contact with the large diameter portion 17b while the distal end portion 3a of the bite type sleeve 3 bites into the coupling pipe 5, at the end. In this state, the gap L smaller than that of the initial state remains between the distal end 5a of the coupling pipe 5 and the innermost portion 16a of the pipe coupling port 16. However the distal end portion 3a of the bite type sleeve 3 sufficiently bites to a degree not to cause any difficulty in sealing between the bite type sleeve 3 and the coupling pipe 5 and fixing of the coupling pipe 5.

Figure 9A:
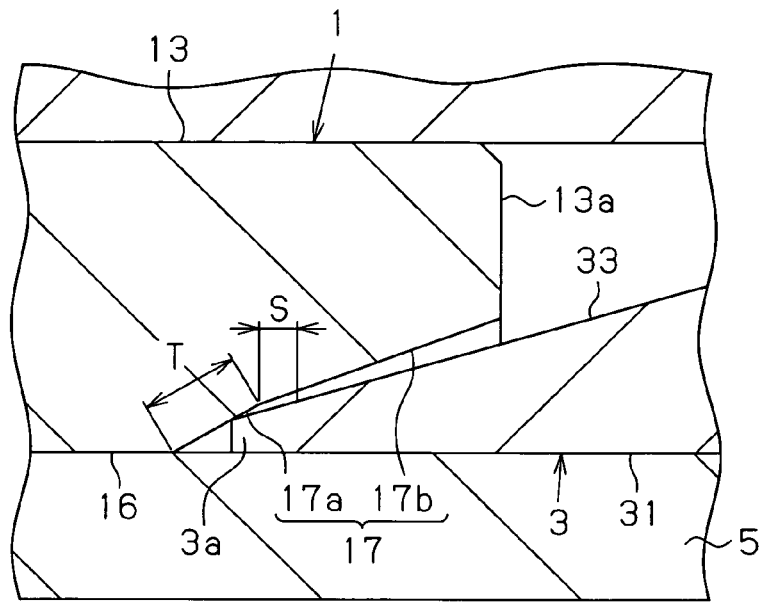
FIGS. 9(a) and 9(b) are partial cross-sectional views of a modification of the pipe joint of FIG. 1, in which the length of a tapered section of a small diameter portion is changed.
Figure 9B:
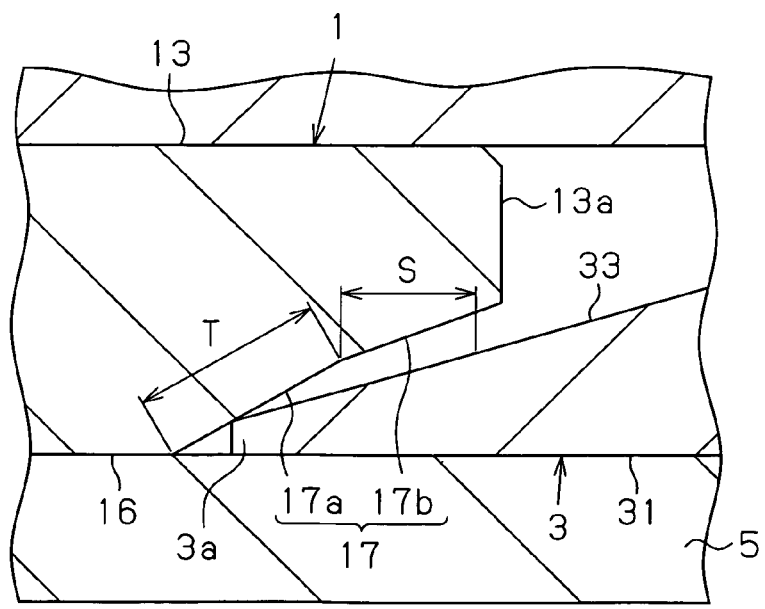
Figure 10A:
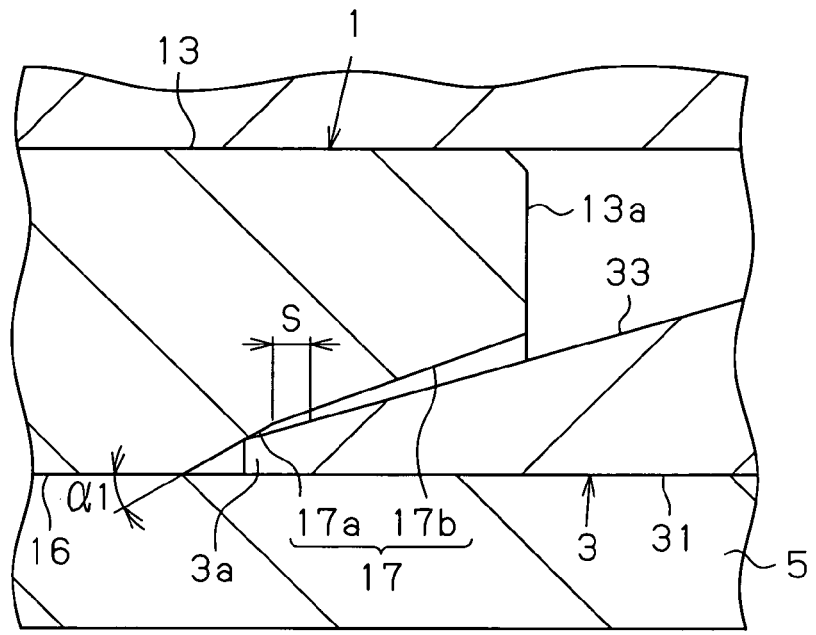
FIGS. 10(a) and 10(b) are partial cross-sectional views of a modification of the pipe joint of FIG. 1, in which the tilt angle of a small diameter portion is changed.
Figure 10B:
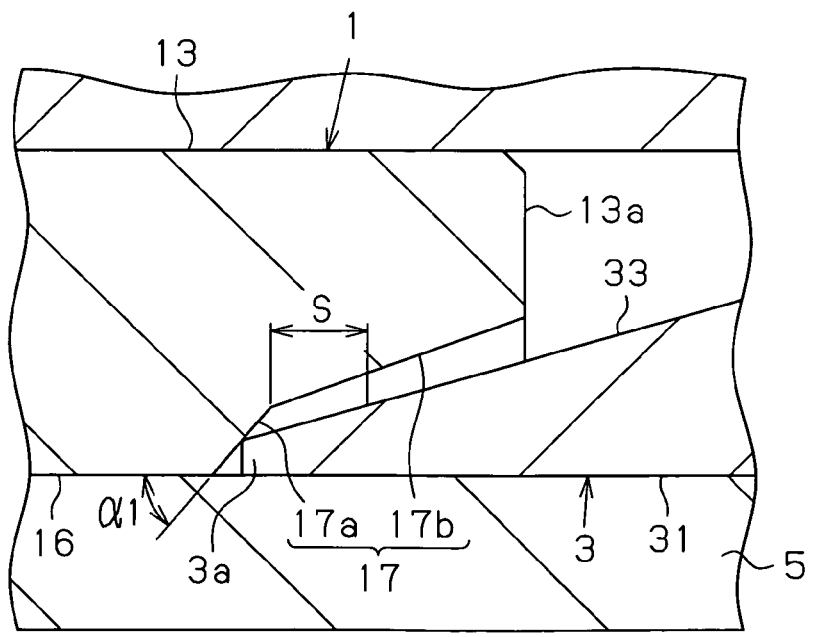

A tapered length T (see FIGS. 9(a) and 9(b)) of the small diameter portion 17a or the tilt angle α1 may be varied. If the length T of a tapered section of the small diameter portion 17a or the tilt angle α1 is varied, the biting amount of the distal end portion 3a of the bite type sleeve 3 is changed accordingly. FIGS. 9(a) and 9(b) show a modification in which the tapered section length T of the small diameter portion 17a is changed, and in FIG. 9(b), the tapered section length T of the small diameter portion 17a is greater than that in FIG. 9(a). As can be seen in FIGS. 9(a) and 9(b), as the tapered section length T of the small diameter portion 17a increases, an axial movement amount S of the bite type sleeve 3 increases until the tapered outer circumferential surface 33 contacts the large diameter portion 17b, whereby the biting amount of the distal end portion 3a increases by an increasing amount of the movement amount S. FIGS. 10(a) and 10(a) show a modification in which the tilt angle α1 of the small diameter portion 17a is changed, and in FIG. 10(b), the tilt angle α1 of the small diameter portion 17a is greater than that in FIG. 10(a). As can be seen in FIGS. 10(a) and 10(b), as the tilt angle α1 of the small diameter portion 17a increases, an axial movement amount S of the bite type sleeve 3 increases until the tapered outer circumferential surface 33 contacts the large diameter portion 17b, whereby the biting amount of the distal end portion 3a increases by an increasing amount of the movement amount S.

According to the present embodiment, the following advantages are obtained.

(1) According to the present embodiment, since the small diameter portion 17a of the guide tapered surface 17 has the relatively large tilt angle α1, the distal end portion 3a of the bite type sleeve 3 bites into the coupling pipe 5 with a relatively large biting angle. Thereby, the force pressing toward the innermost portion 16a of the pipe coupling port 16 acting on the coupling pipe 5 decreases. Thus, even when the distal end 5a of the coupling pipe 5 is not inserted up to the innermost portion 16a of the pipe coupling port 16, the coupling pipe 5 is not greatly moved by fastening the fastening nut 2, and thus sealing performance is improved. In addition, in the present specification, a biting angle is an angle of the biting direction of the distal end portion 3a relative to the central axis.

(2) After the distal end portion 3a of the bite type sleeve 3 bites into the coupling pipe 5 by a necessary amount, the tapered outer circumferential surface 33 of the bite type sleeve 3 makes close contact with the large diameter portion 17b of the guide tapered surface 17. The tapered outer circumferential surface 33 thus makes close contact with the large diameter portion 17b without difficulty while securing a biting amount of the distal end portion 3a. Further, since the large diameter portion 17b, with which the tapered outer circumferential surface 33 of the bite type sleeve 3 makes close contact, is a portion in which a tilt angle relative to the central axis is relatively small among the guide tapered surface 17, a great pressing force is unnecessary when making close contact with the large diameter portion 17b and the tapered outer circumferential surface 33, and a close contact area of the tapered outer circumferential surface 33 and the large diameter portion 17b largely increases.

(3) The bite type sleeve 3 is formed integrally with the fastening nut 2, and the bite type sleeve 3 is separated from the fastening nut 2 by an axial pressing force of the fastening nut 2 before biting into the coupling pipe 5. Since the bite type sleeve 3 is formed integrally with the fastening nut 2, the number of parts decreases and the cost of managing parts thus decreases. Further, since a process of individually assembling the bite type sleeve 3 to the coupling pipe 5 or of mounting the bite type sleeve 3 in the pipe coupling port 16 separately from the fastening nut 2 is omitted, the workability is improved.

(4) The bite type sleeve 3 is connected to an inner wall of the fastening nut 2 through the thin connection 26. Accordingly, the fastening nut 2 is fastened, and the bite type sleeve 3 is easily separated from the fastening nut 2. The bite type sleeve 3 bites into the coupling pipe 5 without rotating together with the fastening nut 2. If the bite type sleeve 3 together with the fastening nut 2 is rotated in a state where the distal end portion 3a bites into the coupling pipe 5, scratch of a rotation direction will be formed on the surface of the coupling pipe 5. However such a case does not occur in the present embodiment.

The bite type pipe joint according to the present embodiment is a two-directional pipe joint, and a bite type pipe coupling structure is used in one joint portion and a pipe coupling structure by brazing is used in the other joint portion. Such a bite type pipe joint is very appropriate when a pipe is coupled to only one joint portion on-site.

(6) In the present embodiment, after the distal end portion 3a of the bite type sleeve 3 bites into the coupling pipe 5 by a predetermined amount with a predetermined angle, the tapered outer circumferential surface 33 of the bite type sleeve 3 is pressed to and make close contact with the guide tapered surface 17. Accordingly, even when the distal end 5a of the coupling pipe 5 is not inserted up to the innermost portion of the pipe coupling port 16, and the gap L exists between the distal end 5a of the coupling pipe 5 and the innermost portion 16a of the pipe coupling port 16, sufficient sealing performance and fixing performance of the coupling pipe 5 are exhibited.

Second Embodiment

Next, a bite type pipe coupling structure and a bite type pipe joint using the same according to a second embodiment of the present invention are described with reference to FIGS. 11 to 13(b). A detailed description of portions of the second embodiment identical to those of the first embodiment is omitted.

Figure 11:
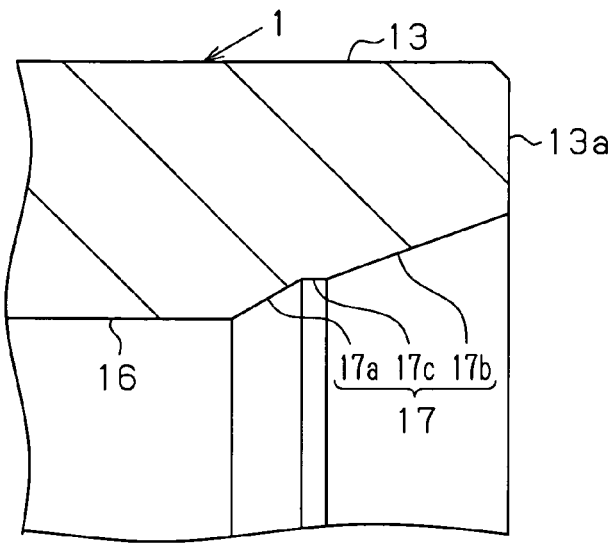
FIG. 11 is a cross-sectional view of a guide tapered surface of a joint main body of a bite type pipe joint according to a second embodiment of the present invention.

The bite type pipe coupling structure and the bite type pipe joint using the same according to the second embodiment are formed by changing the guide tapered surface 17 of the first embodiment. That is, in the second embodiment, the guide tapered surface 17 has an intermediate portion 17c between a small diameter portion 17a and a large diameter portion 17b, as shown in FIG. 11. The intermediate portion 17c has a tilt angle smaller than a tilt angle α2 of the large diameter portion 17b. The tilt angle of the intermediate portion 17c can be appropriately changed as long as it is smaller than the tilt angle α2. In addition, if the tilt angle of the intermediate portion 17c is changed to α2, like a tilt angle of the large diameter portion 17b, the second embodiment becomes identical to the first embodiment. In the second embodiment, an example much different from the first embodiment is that the tilt angle of the intermediate portion 17c is set to 0°. That is, the intermediate portion 17c is a surface in parallel to the central axis.

Figure 12A:
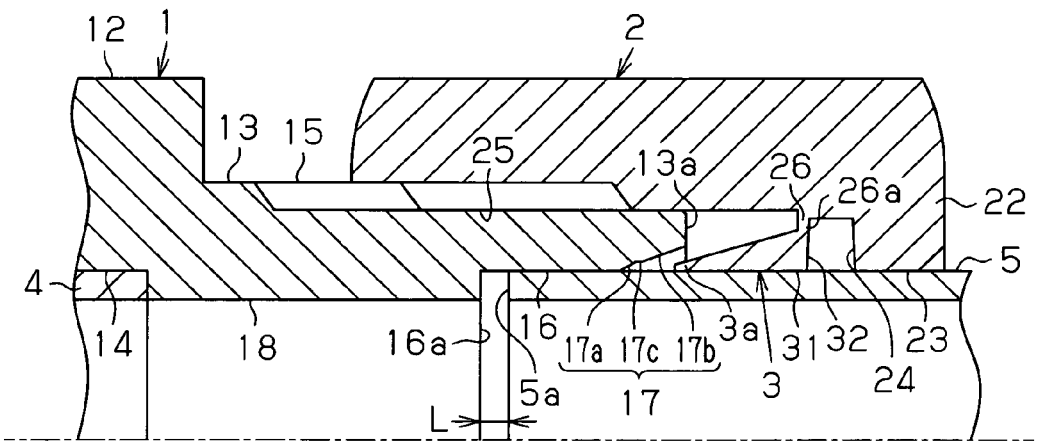
FIG. 12(a) is a partial cross-sectional view of the pipe joint of the second embodiment, illustrating a state when a coupling pipe is inserted into a pipe coupling port and a fastening nut starts being fastened.
Figure 12B:
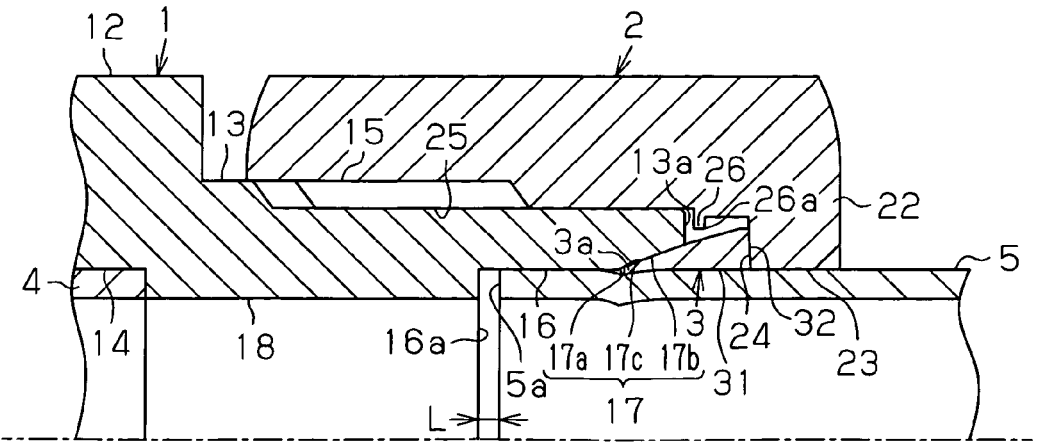
FIG. 12(b) is a partial cross-sectional view of the pipe joint of the second embodiment, illustrating a state when fastening of the fastening nut is fully completed.

As shown in FIGS. 12(a) and 12(b), at the start of fastening of the fastening nut 2 and at the completion of fastening of the fastening nut 2, the second embodiment having the above-described configuration is in the same state as that of the first embodiment. The first embodiment and the second embodiment are different in shapes of the guide tapered surfaces 17 as described above. However, in the second embodiment, the coupling pipe 5 may be coupled, as in the first embodiment. In addition, FIG. 12(a) corresponds to FIG. 6(a) and FIG. 12(b) corresponds to FIG. 6(c).

In the second embodiment, as described in the first embodiment, by changing the tapered section length T of the small diameter portion 17a, the biting amount of the distal end portion 3a of the bite type sleeve 3 can be adjusted. Further, by changing the length M (see FIGS. 13(a) and 13(b)) of the intermediate portion 17c, the biting amount of the distal end portion 3a of the bite type sleeve 3 can be changed.

Figure 13A:
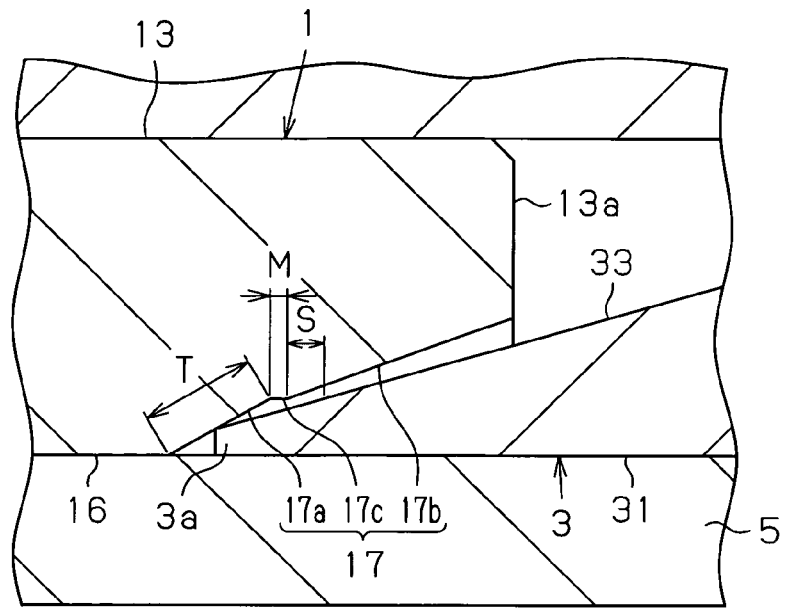
FIGS. 13(a) and 13(b) are partial cross-sectional views of a modification of the pipe joint of the second embodiment, in which the length of the intermediate portion of the guide tapered surface is changed.
Figure 13B:
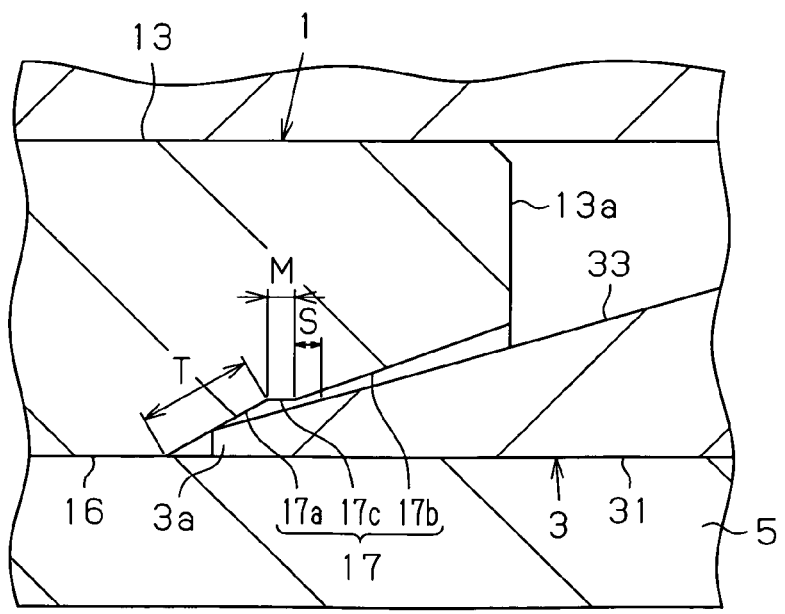
Figure 14:
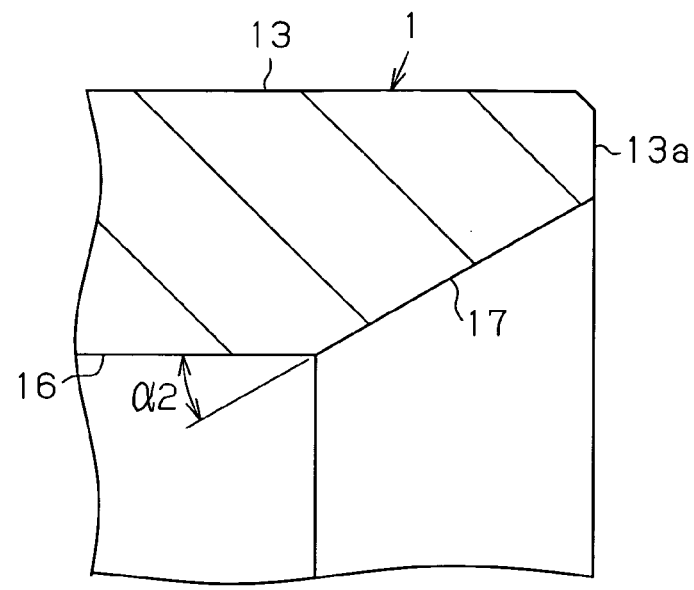
FIG. 14 is a cross-sectional view of a guide tapered surface provided in a joint main body of a bite type pipe joint according to a third embodiment of the present invention.
Figure 15:
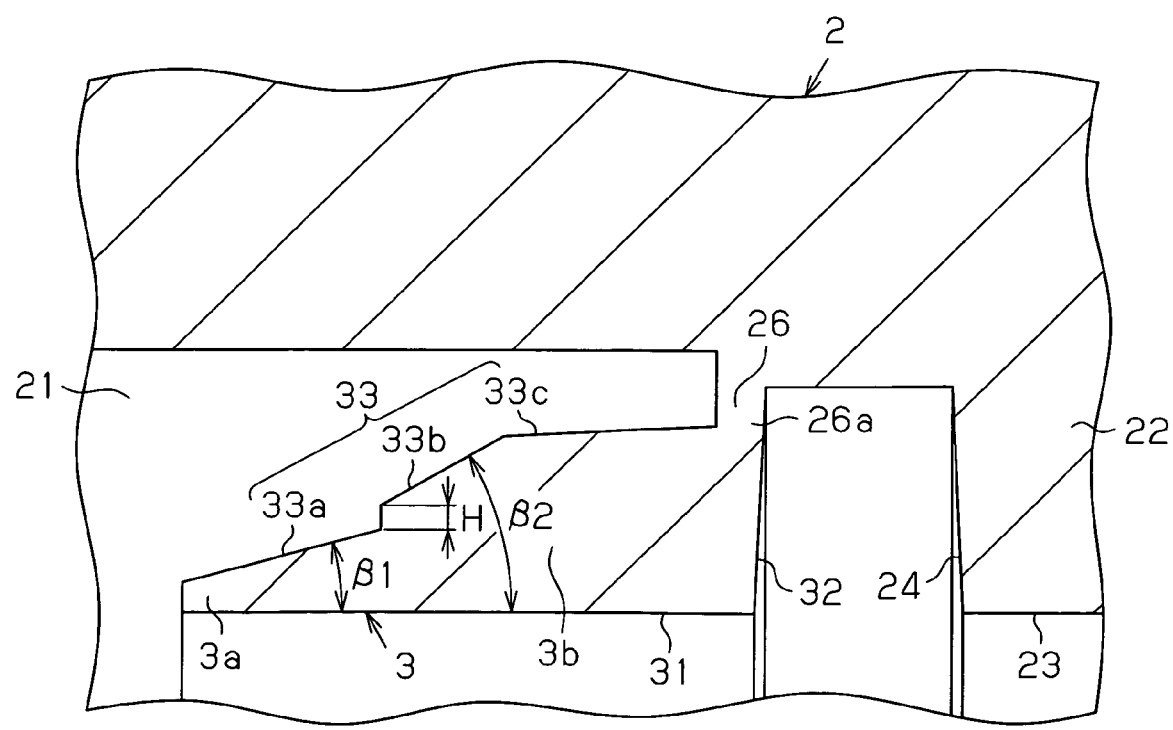
FIG. 15 is a cross-sectional view near a bite type sleeve of the pipe joint according to the third embodiment.

FIGS. 13(a) and 13(b) show a modification in which the length M of the intermediate portion 17c is changed, and in FIG. 13(b), the length M of the intermediate portion 17c is greater than that of FIG. 13(a). As can be seen in FIGS. 13(a) and 13(b), as the length M of the intermediate portion 17c decreases, an axial movement amount S of the bite type sleeve 3 decreases until the tapered outer circumferential surface 33 makes close contact with the large diameter portion 17b. In the second embodiment, by combining the tapered section length T of the small diameter portion 17a and the length M of the intermediate portion 17c, a point in which the tapered outer circumferential surface 33 makes close contact with the large diameter portion 17b can be varied while the biting amount of the distal end portion 3a is maintained constant.

According to the second embodiment, the same advantages as those of the first embodiment are obtained.

Third Embodiment

Next, a bite type pipe coupling structure and a bite type pipe joint using the same according to a third embodiment of the present invention are described with reference to FIGS. 14 to 17(b). A detailed description of portions of the third embodiment identical to those of the first embodiment is omitted.

The bite type pipe coupling structure and the bite type pipe joint using the same according to the third embodiment are formed by changing the guide tapered surface 17 and the tapered outer circumference surface 33 of the bite type sleeve 3 of the first embodiment. That is, in the third embodiment, the entire guide tapered surface 17 is inclined relative to the central axis by an angle α1 identical to the tilt angle of the small diameter portion 17a in the first embodiment. Further, the tapered outer circumferential surface 33 of the bite type sleeve 3 has three tapered outer circumferential surfaces, i.e. a first tapered outer circumferential surface 33a, a second tapered outer circumferential surface 33b, and a third tapered outer circumferential surface 33c, in which a tilt angle relative to the central axis is different. The first tapered outer circumferential surface 33a is an outer circumferential surface of the distal end portion 3a of the bite type sleeve 3. The second tapered outer circumferential surface 33b is a portion of a front side of an outer circumferential surface of a rear side portion 3c of the bite type sleeve 3. The third tapered outer circumferential surface 33c is a portion of a rear side of the outer circumferential surface of the rear side portion 3c of the bite type sleeve 3. A tilt angle β1 of the first tapered outer circumferential surface 33a is identical to the tilt angle β of the bite type sleeve 3 of the first embodiment. The second tapered outer circumferential surface 33b makes close contact with the guide tapered surface 17. A step H is formed between the first tapered outer circumferential surface 33a and the second tapered outer circumferential surface 33b. The outer diameter of the second tapered outer circumferential surface 33b is greater than the outer diameter of the first tapered outer circumferential surface 33a. A tilt angle β2 of the second tapered outer circumferential surface 33b is an angle somewhat smaller than the tilt angle α2 of the guide tapered surface 17. A tilt angle of the third tapered outer circumferential surface 33c is smaller than those of the first tapered outer circumferential surface 33a and the second tapered outer circumferential surface 33b.

Figure 16A:
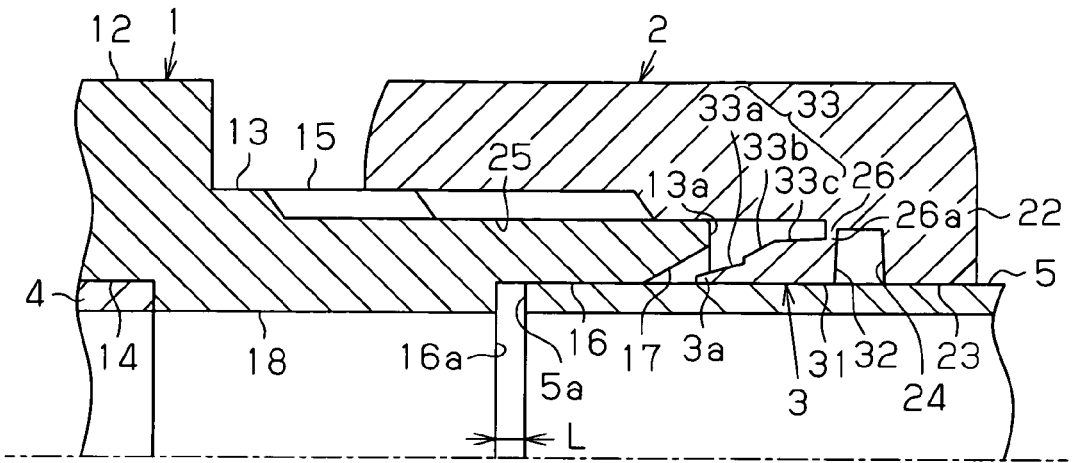
FIG. 16(a) is a partial cross-sectional view of the pipe joint of the third embodiment, illustrating a state when a coupling pipe is inserted into a pipe coupling port and a fastening nut starts being fastened.
Figure 16B:
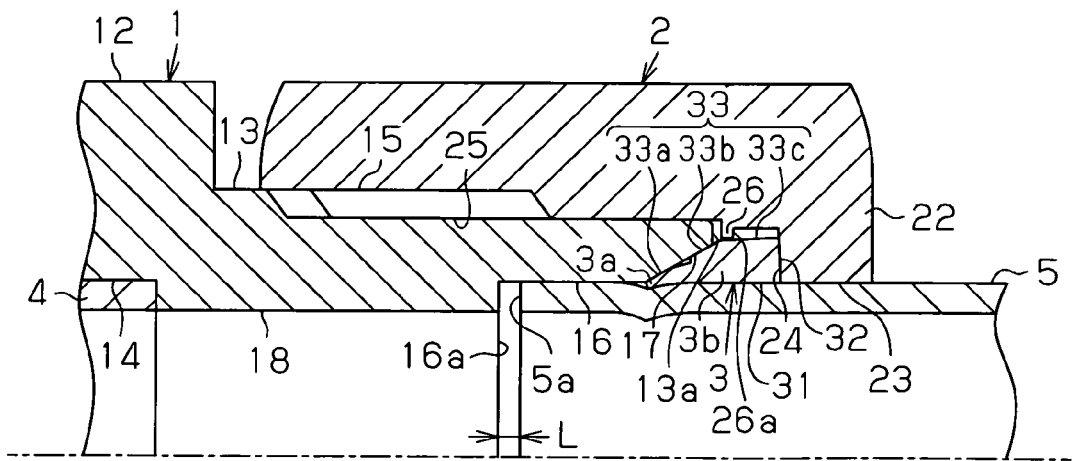
FIG. 16(b) is a partial cross-sectional view of the pipe joint of the third embodiment, illustrating a state when fastening of the fastening nut is fully completed.

In the third embodiment having the above-described configuration, the coupling pipe 5 can be coupled as in the first embodiment, as shown in FIGS. 16(a) and 16(b). In the third embodiment, after the distal end portion 3a of the bite type sleeve 3 bites into the coupling pipe 5, the first tapered outer circumferential surface 33a of the rear side portion 3b of the bite type sleeve 3 makes close contact with the guide tapered surface 17 (see FIG. 16(b)).

In the third embodiment, the same advantages as those of the first embodiment are obtained.

Figure 17A:
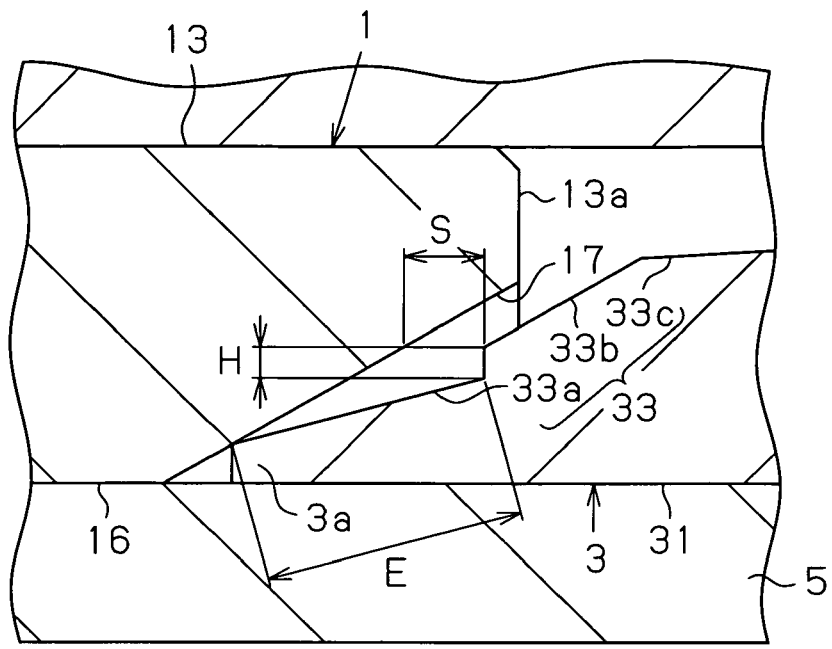
FIGS. 17(a) and 17(b) are partial cross-sectional views of a modification of the pipe joint of the third embodiment, in which the length of the intermediate portion of the bite type sleeve is changed.
Figure 17B:
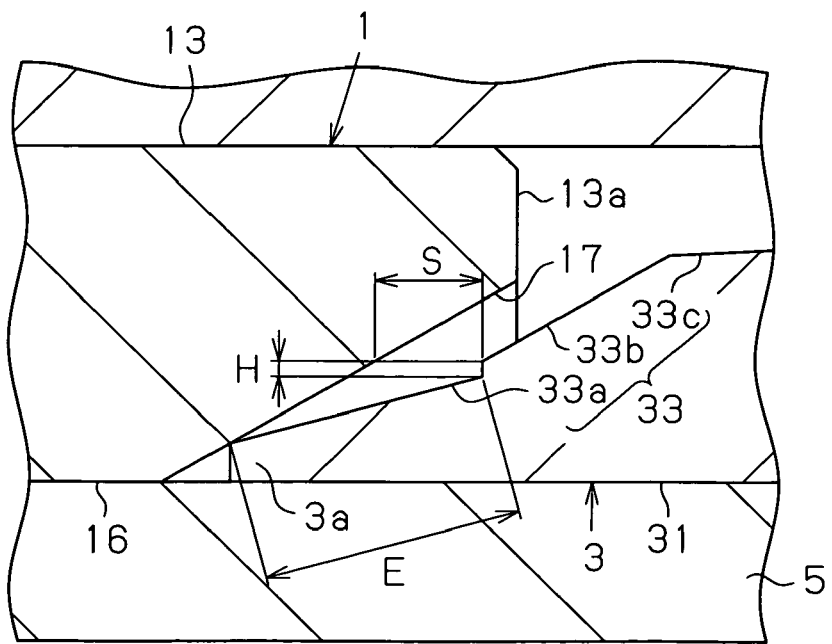

In the third embodiment, by changing the size of the step H, the biting amount of the distal end portion 3a of the bite type sleeve 3 can be adjusted. FIGS. 17(a) and 17(b) show a modification in which the size of the step H is changed, and the size of the step H of FIG. 17(b) is smaller than that of the step H of FIG. 17(a). As can be seen in FIGS. 17(a) and 17(b), as the step H decreases, the axial movement amount S of the bite type sleeve 3 increases until the second tapered outer circumferential surface 33b makes close contact with the guide tapered surface 17, whereby the biting amount of the distal end portion 3a of the bite type sleeve 3 increases. Further, as can be predicted from FIGS. 17(a) and 17(b), as the length E of a tapered section of the first tapered outer circumferential surface 33a of the bite type sleeve 3 increases, an axial movement amount S of the bite type sleeve 3 increases until the second tapered outer circumferential surface 33b makes close contact with the guide tapered surface 17.

Fourth Embodiment

Next, a bite type pipe coupling structure and a bite type pipe joint using the same according to a fourth embodiment of the present invention are described with reference to FIGS. 18(a) to 18(c). A detailed description of portions of the fourth embodiment identical to those of the first embodiment is omitted.

In the bite type pipe coupling structure and the bite type pipe joint using the same according to the fourth embodiment, the bite type sleeve 3 is formed integrally with the joint main body 1, not formed integrally with the fastening nut 2 as in the first embodiment. The bite type sleeve 3 is formed separately from the joint main body 1, and the bite type sleeve 3 is bonded with the joint main body 1 to be integrated with the joint main body 1. Further, in the fourth embodiment, a configuration of the joint main body 1 and the fastening nut 2 is partially changed from that of the first embodiment. In the following description, elements identical to that of the first embodiment that are not described in FIGS. 18(a) to 18(c) are designated by the same reference numerals as those of the first embodiment.

Figure 18A:
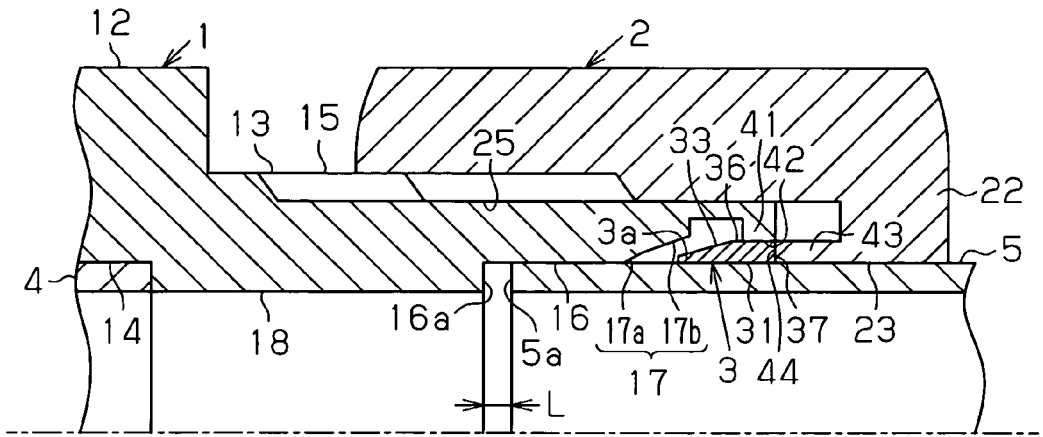
FIG. 18(a) is a partial cross-sectional view of a bite type pipe joint according to a fourth embodiment, illustrating a state when a coupling pipe is inserted into a pipe coupling port and a fastening nut starts being fastened.
Figure 18B:
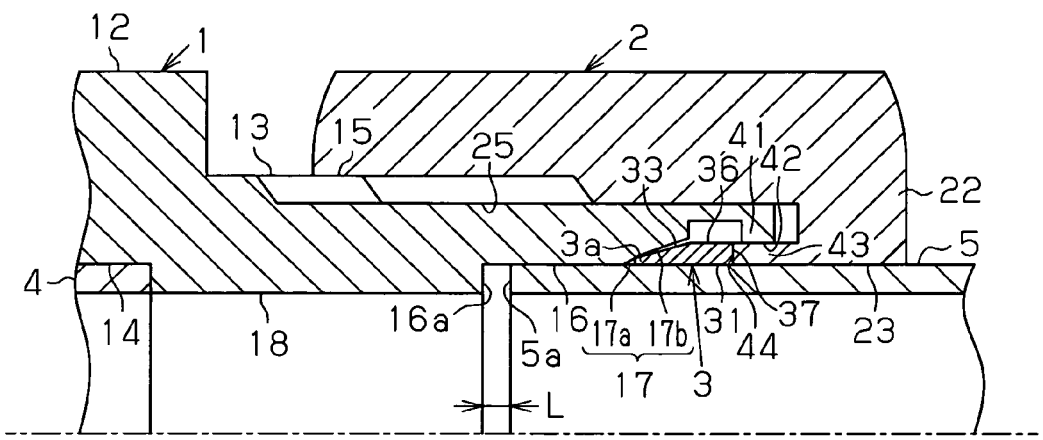
FIG. 18(b) is a partial cross-sectional view of the pipe joint according to the fourth embodiment, illustrating a state when fastening the fastening nut until a distal end portion of the bite type sleeve contacts a guide tapered surface.
Figure 18C:
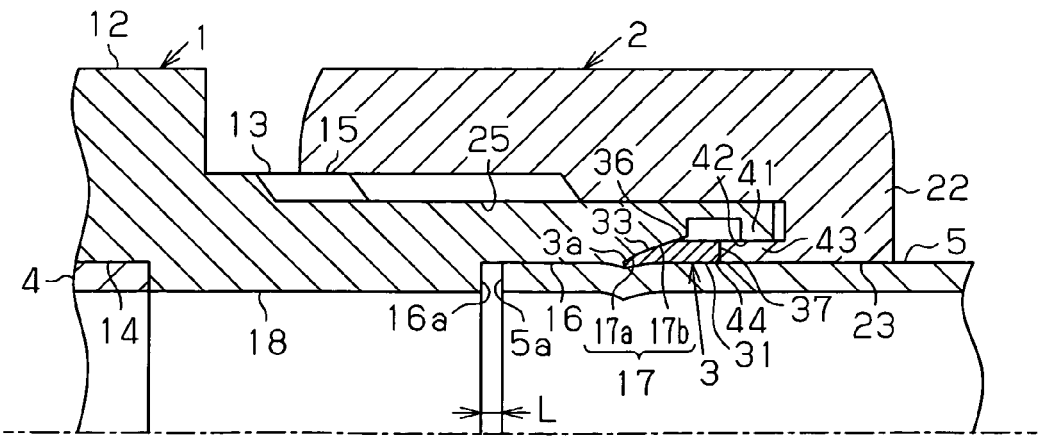
FIG. 18(c) is a partial cross-sectional view of the pipe joint according to the fourth embodiment, illustrating a state when fastening of the fastening nut is fully completed.

As shown in FIGS. 18(a) to 18(c), the joint main body 1 has a nut 12 and a pipe coupling portion 13, as in the first embodiment. A socket 11 is omitted in FIG. 18, but identical to that of the first embodiment. The pipe coupling portion 13 has an external thread 15, a pipe coupling port 16, a guide tapered surface 17 having a small diameter portion 17a and a large diameter portion 17b, and a communicating hole 18, as in the first embodiment. However, an end portion of the pipe coupling portion 13 that is adjacent to the fastening nut 2 has an extended portion 41 and is more extended toward the fastening nut 2 than that of the first embodiment. An inward wall is formed in a distal end portion of the extended portion 41, and an adhesion hole 42 is formed at the center of the inward wall. By inserting the bite type sleeve 3 into the adhesion hole 42, an outer circumferential surface of the bite type sleeve 3 and an inner circumferential surface of the adhesion hole 42 are bonded, and the bite type sleeve 3 is formed integrally with the joint main body 1. In the present embodiment, the inner circumferential surface of the adhesion hole 42 bonded to the outer circumferential surface of the bite type sleeve 3 forms an adhesion surface.

A through hole 23 for receiving the coupling pipe 5 is formed at the center of the side wall 22 of the fastening nut 2, as in the first embodiment. An internal thread 25 screwed onto the external thread 15 of the joint main body 1 is formed in the inner circumferential surface of the fastening nut 2. The fastening nut 2 of the fourth embodiment is different from the fastening nut 2 of the first embodiment in having a protruding portion 43 extending from an inner wall surface of the side wall 22 toward the joint main body 1 (toward the inside of the fastening nut 2). An end surface of the protruding portion 43 that is adjacent to the joint main body 1 functions as a pressing surface 44 for pressing the bite type sleeve 3. When the fastening nut 2 is fastened by being screwed to the joint main body 1, the extended portion 41 of the pipe coupling portion 13 is disposed around the protruding portion 43.

The bite type sleeve 3 has a through hole 31 for fitting the coupling pipe 5, as in the first embodiment. An outer circumferential surface of a distal end portion of the bite type sleeve 3 is a tapered outer circumferential surface 33 inclined by an angle β relative to the central axis. An outer circumferential surface of a rear side portion of the bite type sleeve 3 is a joint surface 36, which is substantially parallel to the central axis. A rear end surface of the bite type sleeve 3 functions as a pressure receiving surface 37 contacting the pressing surface 44 of the fastening nut 2. The bite type sleeve 3 is made of a copper alloy like the fastening nut 2 and the joint main body 1 and is formed separately from the fastening nut 2 and the joint main body 1. Thereafter, the joint surface 36 of the bite type sleeve 3 is bonded to the inner circumferential surface (a joint surface) of the adhesion hole 42, and the bite type sleeve 3 is thus formed integrally with the joint main body 1. Adhesion between the outer circumferential surface of the bite type sleeve 3 and the inner circumferential surface of the adhesion hole 42 allows the bite type sleeve 3 to be separated from the joint main body 1 by an axial pressing force from the fastening nut 2.

In the fourth embodiment, coupling of the coupling pipe 5 is performed as follows. First, in a state where the fastening nut 2 and the bite type sleeve 3 are assembled in the coupling pipe 5, the distal end portion of the coupling pipe 5 is inserted into the pipe coupling port 16. At this time, the distal end 5a of the coupling pipe 5 does not contact the innermost portion 16a of the pipe coupling port 16 and forms a gap L between the distal end 5a of the coupling pipe 5 and the innermost portion 16a of the pipe coupling port 16.

Next, until the pressing surface 44 of the fastening nut 2 contacts the pressure receiving surface 37 of the bite type sleeve 3, the fastening nut 2 is fastened to the joint main body 1 (see FIG. 18(a)). Thereafter, the fastening nut 2 is further fastened, a force from the pressing surface 44 of the fastening nut 2 acts on the pressure receiving surface 37 of the bite type sleeve 3. The bite type sleeve 3 is thus separated from the joint main body 1 to be pressed toward a guide tapered surface (see FIG. 18(b)). At this time, since the force pressing toward the innermost portion 16a of the pipe coupling port 16 does not act on the coupling pipe 5, the size of the gap L is not changed.

Thereafter, the fastening nut 2 is further fastened, the distal end portion 3a of the bite type sleeve 3 is deformed to bite into the coupling pipe 5 with a large biting angle while being guided to the small diameter portion 17a of the guide tapered surface 17. At this time, since the force pressing toward the innermost portion 16a of the pipe coupling port 16 acts on the coupling pipe 5, the size of the gap L decreases. However, since the tilt angle α1 of the small diameter portion 17a is set to be relatively large, the force pressing toward the innermost portion 16a of the pipe coupling port 16 and acting on the coupling pipe 5 is relatively small and movement of the coupling pipe 5 is thus suppressed to be small.

Thereafter, as shown in FIG. 18(c), the fastening nut 2 is further fastened until the tapered outer circumferential surface 33 of the bite type sleeve 3 makes close contact with the large diameter portion 17b of the guide tapered surface 17. The fastening of the fastening nut 2 is thus completed. Thereby, even when the gap L exists between the distal end 5a of the coupling pipe 5 and the innermost portion 16a of the pipe coupling port 16, the coupling pipe 5 is surely coupled to the joint main body 1 so that fluid is not leaked to the outside.

The bite type pipe coupling structure and a bite type pipe joint using the same according to the fourth embodiment have the following advantages in addition to the above-described advantages (1), (2), (5) and (6) of the first embodiment.

(1) Since the bite type sleeve 3 is formed integrally with the joint main body 1, the number of parts decreases, and the cost of managing parts decreases. Further, since a process of individually assembling the bite type sleeve 3 to the coupling pipe 5 or of mounting the bite type sleeve 3 in the pipe coupling port 16 separately from the joint main body 1 is omitted, the workability is improved.

(2) In the fourth embodiment, the outer circumferential surface of the bite type sleeve 3 contacts the inner circumferential surface of the adhesion hole 42 of the joint main body 1 so that the bite type sleeve 3 is formed integrally with the joint main body 1. Adhesion between the outer circumferential surface of the bite type sleeve 3 and the inner circumferential surface of the adhesion hole 42 allows the bite type sleeve 3 to be separated from the joint main body 1 by an axial pressing force from the fastening nut 2 generating when fastening the fastening nut 2. Therefore, the bite type sleeve 3 is easily and automatically separated form the joint main body 1 by fastening the fastening nut 2.

Fifth Embodiment

Figure 19A:
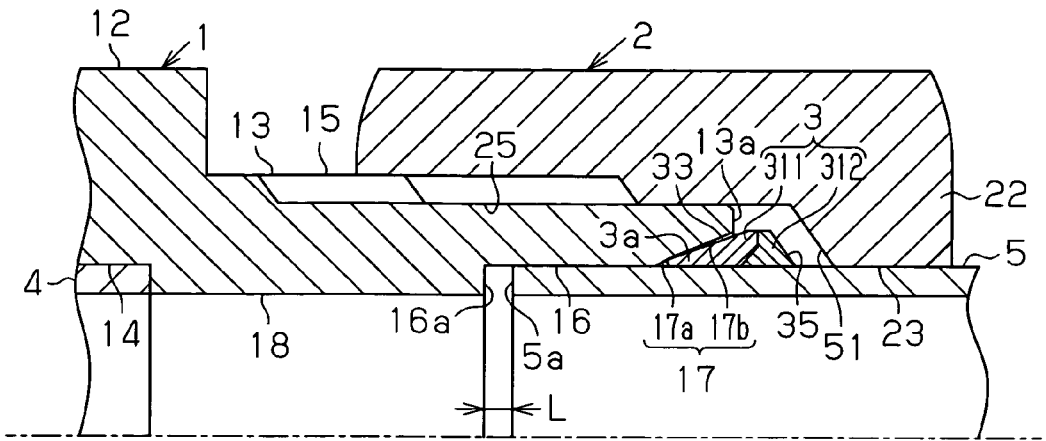
FIG. 19(a) is a partial cross-sectional view of a bite type pipe joint according to a fifth embodiment, illustrating a state when a coupling pipe is inserted into a pipe coupling port and a bite type sleeve is not pressed by a fastening nut.
Figure 19B:
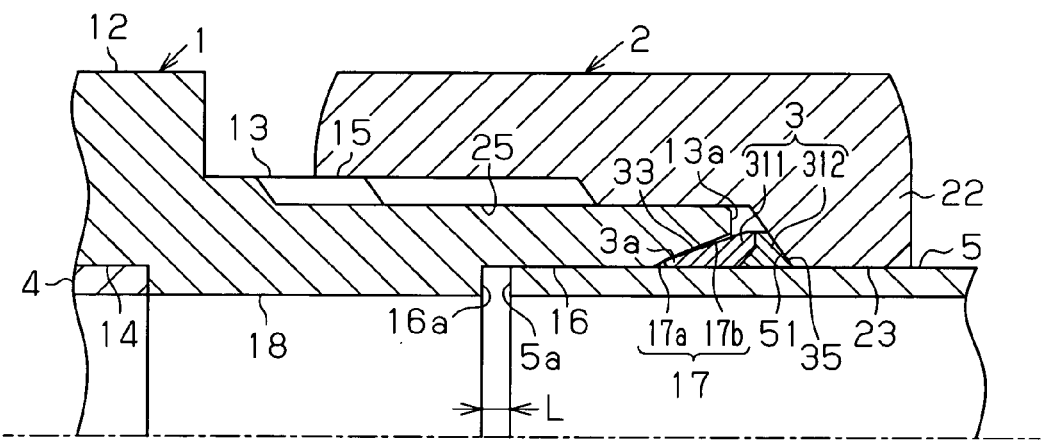
FIG. 19(b) is a partial cross-sectional view of the pipe joint according to the fifth embodiment, illustrating a state when fastening the fastening nut until a distal end portion of the bite type sleeve contacts a guide tapered surface.
Figure 19C:
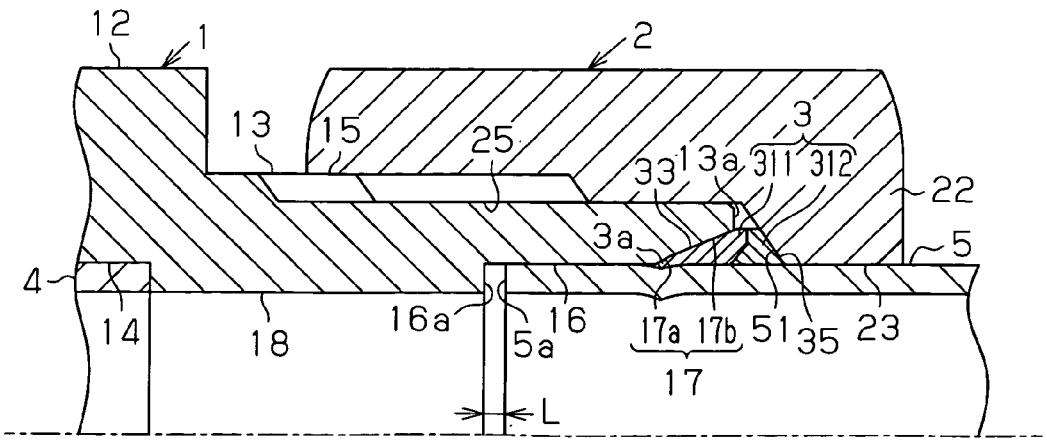
FIG. 19(c) is a partial cross-sectional view of the pipe joint according to the fifth embodiment, illustrating a state when fastening of the fastening nut is fully completed.

Next, a bite type pipe coupling structure and a bite type pipe joint using the same according to a fifth embodiment of the present invention are described with reference to FIGS. 19(a) to 19(c). A detailed description of portions of the fifth embodiment identical to those of the first embodiment is omitted.

In the bite type pipe coupling structure and a bite type pipe joint using the same according to the fifth embodiment, the bite type sleeve 3 is formed separately from the fastening nut 2 and the joint main body 1, is not formed integrally with the fastening nut 2 or the joint main body 1. Further, the bite type sleeve 3 of the fifth embodiment can be divided into two. In the following description, elements identical to that of the first embodiment that are not described in FIGS. 19(a) to 19(c) are designated by the same reference numerals as those of the first embodiment.

The bite type sleeve 3 is made of a copper alloy like the fastening nut 2 and the joint main body 1 and is formed separately from the fastening nut 2 and the joint main body 1. The bite type sleeve 3 has a through hole 31 for fitting the coupling pipe 5, as in the first embodiment. The bite type sleeve 3 includes a joint main body portion 311 and a fastening nut portion 312 that can be separated from each other. A division line between the joint main body portion 311 and the fastening nut portion 312 is perpendicular to the center line of the pipe joint in an outer circumference side and is inclined in the same direction with the guide tapered surface 17 in an inner circumference side, as shown in FIGS. 19(a) to 19(c). A tilt angle of the division line of the inner circumference side is greater than that of the guide tapered surface 17. The outer circumferential surface of the joint main body portion 311 is a tapered outer circumferential surface 33 inclined by an angle β relative to the central axis. A rear end surface (i.e. a rear end surface of the fastening nut portion 312) of the bite type sleeve 3 functions as a pressure receiving surface 35 pressed by the fastening nut 2. The pressure receiving surface 35 is inclined by a predetermined angle relative to the central axis.

Inside the fastening nut 2, a substantially cylindrical space is defined. An inner wall surface of the side wall 22 of the fastening nut 2 functions as a pressing surface 51 for pressing the pressure receiving surface 35 of the bite type sleeve 3. The pressing surface 51 is inclined by a predetermined angle relative to the central axis. The bite type pipe coupling structure and the bite type pipe joint using the same according to the fifth embodiment have the same configuration as that of the first embodiment, except for the above-described points. For example, a configuration of the joint main body 1 having the guide tapered surface 17 is completely identical to that of the first embodiment.

As shown in FIGS. 19(*a*) to 19(*c*), in the fifth embodiment, coupling of the coupling pipe 5 is performed as in the first embodiment. That is, as shown in FIG. 19(*a*), in a state where the fastening nut 2 and the bite type sleeve 3 are assembled in the coupling pipe 5, the distal end portion of the coupling pipe 5 is first inserted into the pipe coupling port 16 of the joint main body 1. At this time, the distal end 5*a* of the coupling pipe 5 does not contact the innermost portion 16*a* of the pipe coupling port 16 and forms a gap L between the distal end 5*a* of the coupling pipe 5 and the innermost portion 16*a* of the pipe coupling port 16.

Next, the fastening nut 2 is threaded and fastened onto the external thread 15 of the joint main body 1, and the pressing surface 51 of the fastening nut 2 contacts the pressure receiving surface 35 of the bite type sleeve 3. The bite type sleeve 3 is thus pressed toward the guide tapered surface 17, as shown in FIG. 19(*b*). At this time, since the force pressing toward the innermost portion 16*a* of the pipe coupling port 16 does not yet act on the coupling pipe 5, the size of the gap L is not changed.

Thereafter, the fastening nut 2 is further fastened, and the distal end portion 3*a* of the bite type sleeve 3 is deformed to bite into the coupling pipe 5 with a large biting angle while being guided to the small diameter portion 17*a* of the guide tapered surface 17. At this time, since the force pressing toward the innermost portion 16*a* of the pipe coupling port 16 acts on the coupling pipe 5, the size of the gap L decreases. However, since the tilt angle α1 of the small diameter portion 17*a* is set to be relatively large, the force pressing toward the innermost portion 16*a* of the pipe coupling port 16 and acting on the coupling pipe 5 is relatively small and thus movement of the coupling pipe 5 is suppressed to be small.

Thereafter, as shown in FIG. 19(*c*), the fastening nut 2 is further fastened until the tapered outer circumferential surface 33 of the bite type sleeve 3 makes close contact with the large diameter portion 17*b* of the guide tapered surface 17. The fastening of the fastening nut 2 is thus completed. Thereby, even when the gap L exists between the distal end 5*a* of the coupling pipe 5 and the innermost portion 16*a* of the pipe coupling port 16, the coupling pipe 5 is surely coupled to the joint main body 1 so that fluid is not leaked to the outside.

In the bite type pipe coupling structure and the bite type pipe joint using the same according to the fifth embodiment, a conventional bite type sleeve 3 may be used. Further, the bite type pipe coupling structure and the bite type pipe joint using the same according to the fifth embodiment have the above-mentioned advantages (1), (2), (5), and (6) of the first embodiment.

Sixth Embodiment

Figure 20:
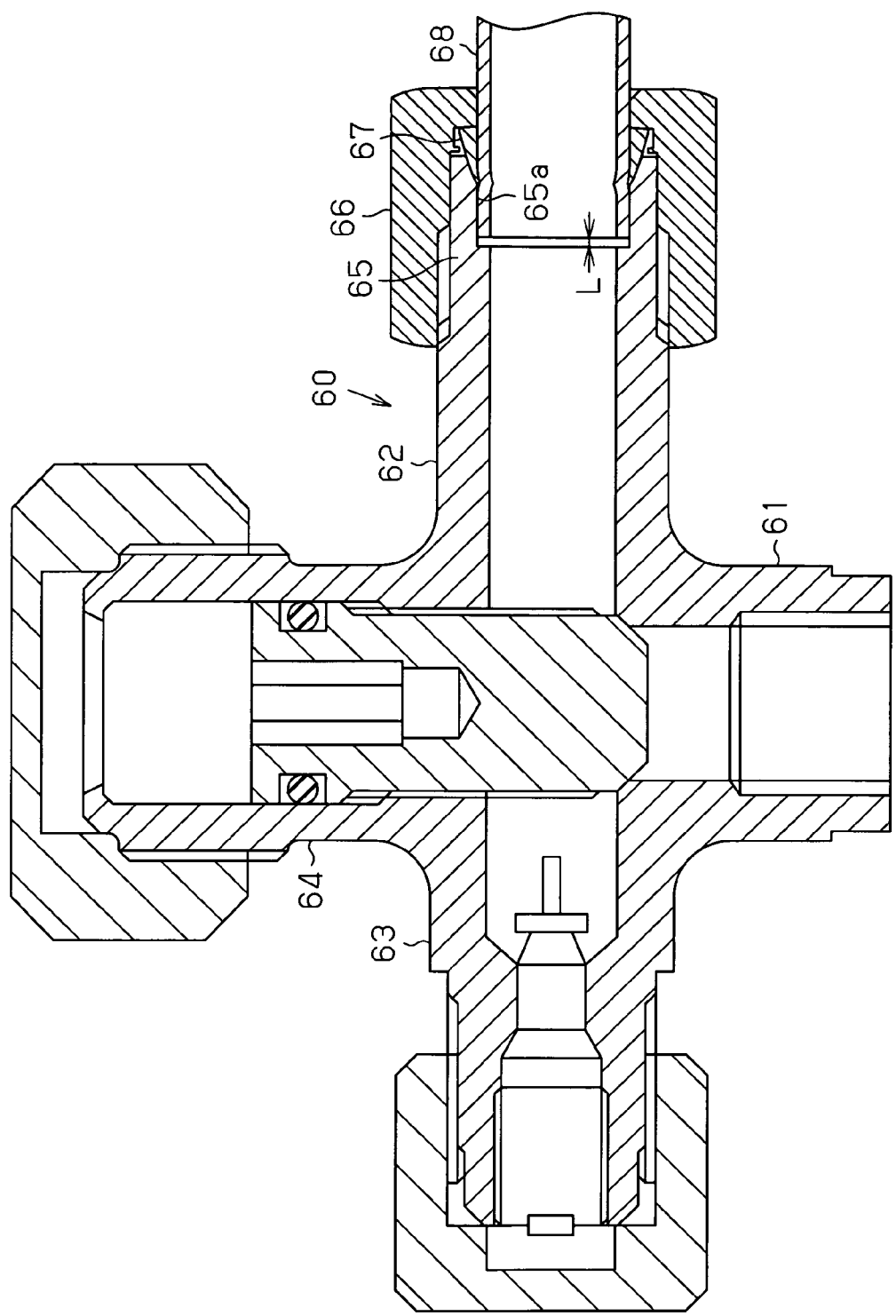
FIG. 20 is a partial cross-sectional view illustrating a coupling state of a closing valve according to a sixth embodiment of the present invention.

Next, a sixth embodiment of the present invention is described with reference to FIG. 20.

In the sixth embodiment, a closing valve 60 having a coupling portion that extends in three directions is described. The coupling portion has the bite type pipe coupling structure according to the first embodiment. As shown in FIG. 7, the closing valve 60 has a substantially cross-shaped housing, and in the housing, a first cylinder 61, a second cylinder 62, a third cylinder 63, and a fourth cylinder 64 are coupled to communicate with each other. The first cylinder 61 forms a first port and is coupled to a fixed pipe (not shown) by brazing. The second cylinder 62 forms a second port, has the bite type pipe coupling structure according to the first embodiment, and is detachably coupled to a coupling pipe 68. The third cylinder 63 forms a service port with a check valve for vacuuming a refrigerant circuit or charging a refrigerant to the refrigerant circuit. The fourth cylinder 64 forms a manipulation unit of the closing valve 60.

The second cylinder 62 has a pipe coupling portion 65 identical to the pipe coupling portion 13 of the first embodiment. A fastening nut 66 is screwed to the pipe coupling portion 65. A bite type sleeve 67 is provided between the fastening nut 66 and an end portion of the pipe coupling portion 65. The fastening nut 66 and the bite type sleeve 67 have the same configuration as that of the fastening nut 2 and the bite type sleeve 3 of the first embodiment, respectively. Thereby, the fastening nut 66 is formed integrally with the bite type sleeve 67 before being fastened to the second cylinder 62. In this way, the coupling pipe 68 is coupled to the pipe coupling portion 65 of the closing valve 60 using the same bite type pipe coupling structure as that of the first embodiment. Therefore, in the closing valve 60 according to the sixth embodiment, fluid is suppressed from being leaked from a coupling portion of the coupling pipe 68 and the workability when coupling a pipe is improved. Further, even if the fastening nut 66 is fastened in a state where a gap L exists between a distal end of the coupling pipe 68 and the innermost portion of a pipe coupling port 65*a*, sealing of the coupling portion of the coupling pipe 68 and fixing of the coupling pipe 68 are performed without difficulty.

Seventh Embodiment

Figure 21:
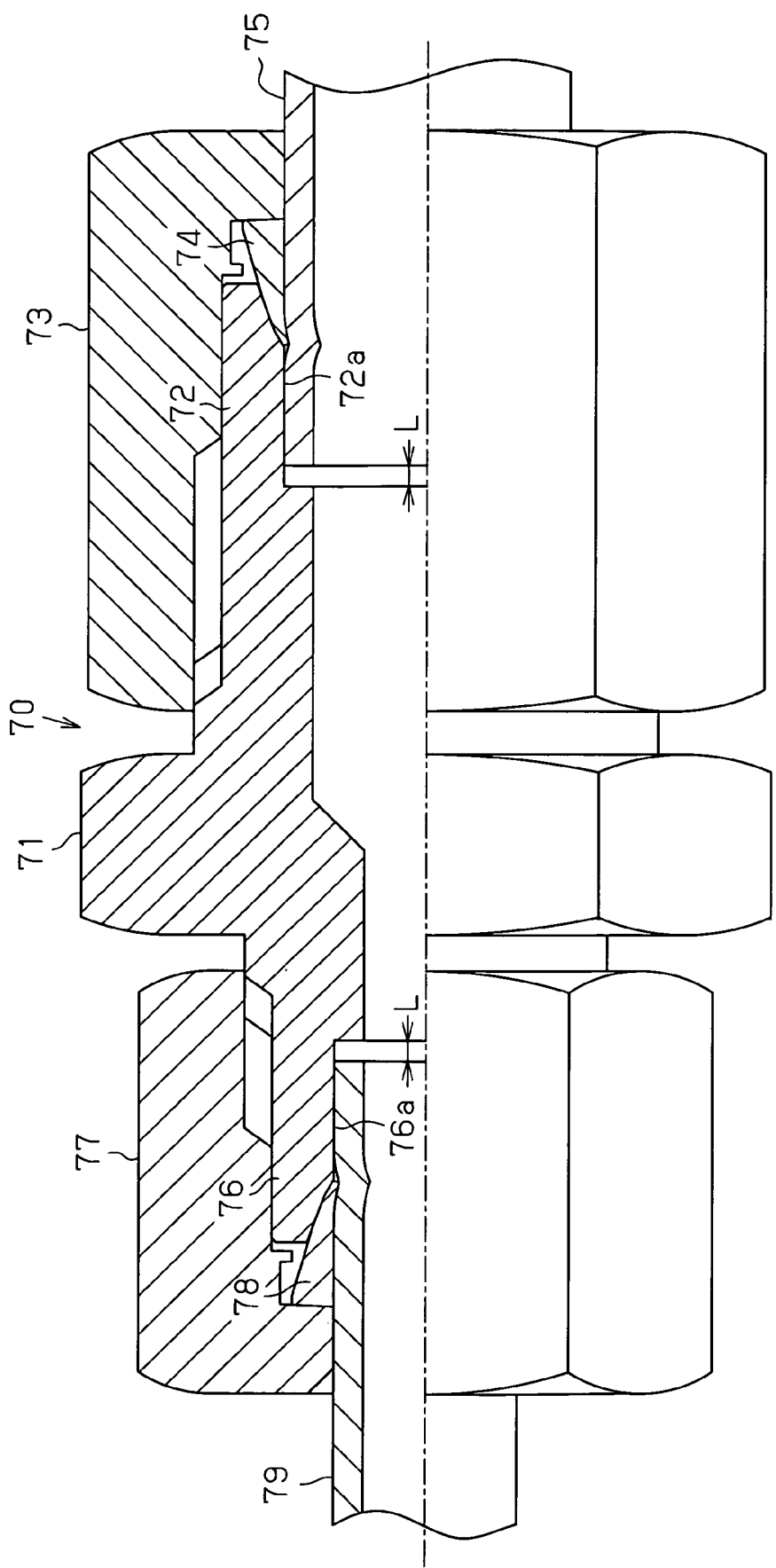
FIG. 21 is a partial cross-sectional view illustrating a coupling state of a bite type different diameter pipe joint according to a seventh embodiment of the present invention.

Next, a seventh embodiment according to the present invention is described with reference to FIG. 21.

In the seventh embodiment, a different diameter pipe joint 70 having a coupling portion that extends in two directions is described. The coupling portion has the bite type pipe coupling structure according to the first embodiment. As shown in FIG. 21, the different diameter pipe joint 70 has a joint main body 71, and two pipe coupling portions 72 and 76 are provided at both ends of the joint main body 71. The pipe coupling portions 72 and 76 have the same structure as that of the pipe coupling portion 13 of the first embodiment. Fastening nuts 73 and 77 are screwed to the pipe coupling portions 72 and 76, respectively. Bite type sleeves 74 and 78 are disposed between the fastening nuts 73 and 77 and the pipe coupling portions 72 and 76, respectively. The fastening nuts 73 and 77 and the bite type sleeves 74 and 78 have the same configuration as that of the fastening nut 2 and the bite type sleeve 3 of the first embodiment, respectively. In the present embodiment, the diameter of a coupling pipe 75 is larger than that of a coupling pipe 79. Accordingly, the diameter of the pipe coupling portion 72 to which the coupling pipe 75 is coupled is greater than that of the pipe coupling portion 76 to which the coupling pipe 79 is coupled.

The different diameter pipe joint 70 according to the seventh embodiment has the pipe coupling portions 72 and 76 extending in two directions, and the bite type pipe coupling structure according to the first embodiment is applied to a pipe coupling structure of each of the pipe coupling portions 72 and 76. According to the different diameter pipe joint 70, fluid is suppressed from being leaked from the pipe coupling portions 72 and 76 and the workability when coupling a pipe is improved. Further, even if the fastening nuts 73 and 77 are fastened in a state where gaps L exist between distal ends of the coupling pipes 75 and 79 and innermost portions of pipe coupling ports 72a and 76a, sealing of coupling portions of the coupling pipes 75 and 79 and fixing of the coupling pipes 75 and 79 are performed without difficulty.

Eighth Embodiment

Figure 22:
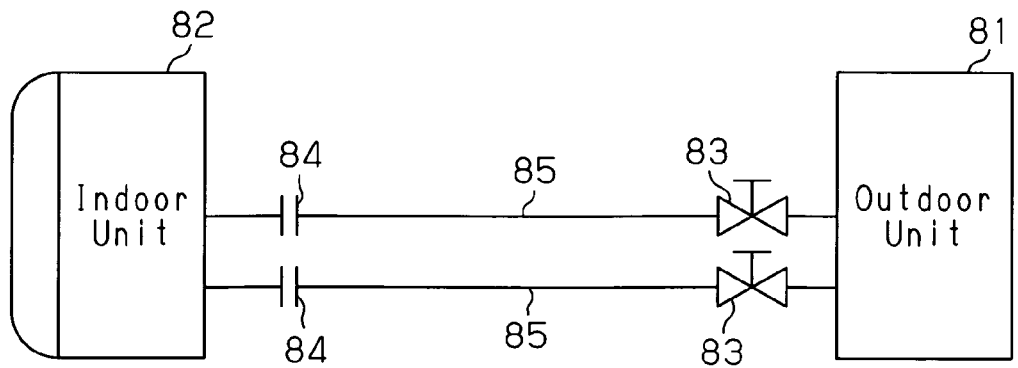
FIG. 22 is a schematic diagram of a refrigerating cycle apparatus according to an eighth embodiment of the present invention.

Next, a refrigerating cycle apparatus according to an eighth embodiment of the present invention is described with reference to FIG. 22. FIG. 22 shows the entire configuration of a separate type air conditioner as a refrigerating cycle apparatus using a hydrocarbon (HC) refrigerant such as propane. The separate type air conditioner of FIG. 22 has one indoor unit 81 and one outdoor unit 82. Closing valves 83 are attached to a port of the outdoor unit 81, and pipe joints 84 are attached to a port of the indoor unit 82. The closing valves 83 and the pipe joints 84 are coupled to each other through connecting pipes 85. The bite type pipe coupling structure according to the first embodiment is used for a coupling portion between each closing valve 83 and each connecting pipe 85a and a coupling portion between each pipe joint 84 and each connecting pipe 85. That is, the closing valve 60 according to the sixth embodiment is used for each of the closing valve 83, and the bite type pipe joint according to the first embodiment is used for each of the pipe joint 84.

In the refrigerating cycle apparatus according to the eighth embodiment, the coupling structure between each closing valve 83 and each connecting pipe 85 detachably coupled thereto and the coupling structure between each pipe joint 84 and each connecting pipe 85 detachably coupled thereto are identical to the bite type pipe coupling structure according to the first embodiment. Therefore, a refrigerant is suppressed from being leaked from the pipe coupling portions of each of the connecting pipe 85, and the workability when coupling the connecting pipes 85 is improved. Further, since closing valves and pipe joints having less leakage of a refrigerant are used, the reliability of the refrigerating cycle apparatus using a HC refrigerant is improved.

Ninth Embodiment

Figure 23:
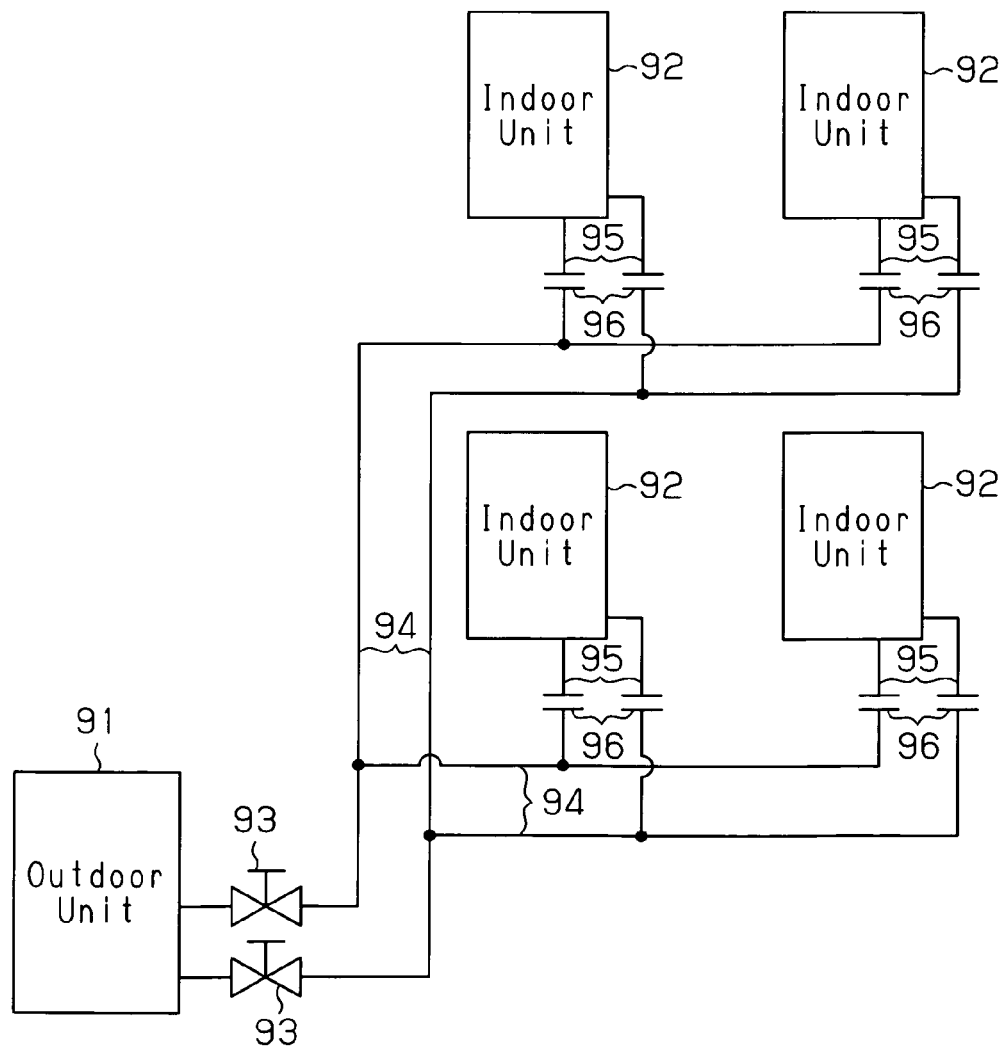
FIG. 23 is a schematic diagram of a refrigerating cycle apparatus according to a ninth embodiment of the present invention.

Next, a refrigerating cycle apparatus according to a ninth embodiment is described with reference to FIG. 23. FIG. 23 shows the entire configuration of a separate type air conditioner as a refrigerating cycle apparatus using a HC refrigerant such as propane. The separate type air conditioner of FIG. 23 has one outdoor unit 91 and a plurality (four) of indoor units 92. Closing valve 93 are attached to a port of the outdoor unit 91. By performing an on-site pipe construction, a main connecting pipe 94 is coupled to each of the closing valves 93, and branch pipes 95 are coupled to each main connecting pipe 94. Each of the branch pipes 95 has a diameter smaller than corresponding one of the main connecting pipes 94. Each branch pipe 95 is coupled to the corresponding main connecting pipe 94 using a different diameter pipe joint 96. Each indoor unit 92 is coupled in parallel to the outdoor unit 91 through one of the branch pipes 95 and one of the main connecting pipes 94.

In the above-described configuration, the bite type pipe coupling structure according to the first embodiment is applied to the pipe coupling portion of each closing valve 93 and specifically, the closing valve 60 according to the sixth embodiment is used. Further, the bite type pipe coupling structure according to the first embodiment is applied to the pipe coupling portion of each different diameter pipe joint 96 and specifically, the different diameter pipe joint 70 according to the seventh embodiment is used.

In a refrigerating cycle apparatus according to the ninth embodiment, the bite type pipe coupling structure according to the first embodiment is used for the coupling portion between each branch pipe 95 and the corresponding main connecting pipe 94 that are coupled to each other on-site. Accordingly, a refrigerant is suppressed from being leaked from the pipe coupling portions of between each branch pipe 95 and the corresponding main connecting pipe 94, and the workability when coupling of each of the main connecting pipes 94 to the branch pipes 95 is performed on-site is improved. Further, since closing valves and different diameter pipe joints having less leakage of a refrigerant are used, the reliability of the refrigerating cycle apparatus using a HC refrigerant is improved.

Tenth Embodiment

Figure 24:
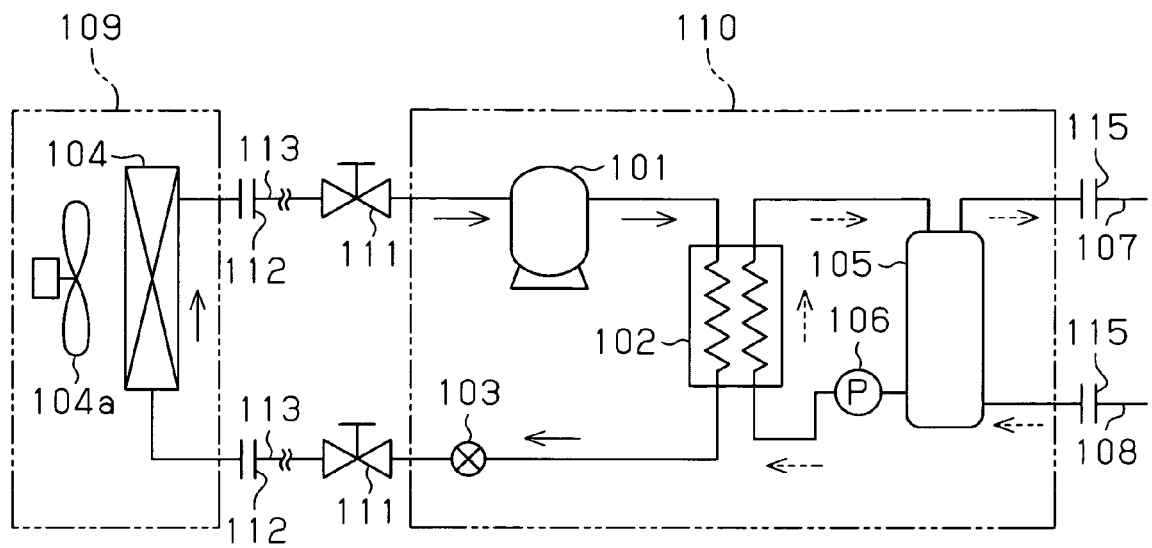
FIG. 24 is a schematic diagram of a refrigerating cycle apparatus according to a tenth embodiment of the present invention.

Next, a refrigerating cycle apparatus according to a tenth embodiment is described with reference to FIG. 24. FIG. 24 shows the entire configuration of a heat pump type hot-water supply apparatus as a refrigerating cycle apparatus using a natural refrigerant such as carbon dioxide. In the heat pump type hot-water supply apparatus, condensation heat of a condenser is used as a heat source of a hot-water supply. The heat pump type hot-water supply apparatus of FIG. 24 has a refrigerant circuit in which a refrigerant circulates in a solid line arrow direction of FIG. 24. In the refrigerant circuit, a compressor 101, a water heat exchanger 102 for radiating condensation heat of a refrigerant to water for hot-water supply, an expansion valve 103, and a heat exchanger 104 for a heat source using external air as a heat source are disposed and coupled in this order. The refrigerant circuit is filled with a refrigerant consisting of carbon dioxide, and the refrigerant circuit is operated with a supercritical refrigeration cycle and heats water for hot-water supply in the water heat exchanger 102 using heat from external air.

In a hot-water supply circuit having the water heat exchanger 102, as indicated by broken line arrows of FIG. 24, water for hot-water supply circulates in order through the bottom of a hot-water storage tank 105, a water circulation pump 106, the water heat exchanger 102, an upper part of the hot-water storage tank 105, and the bottom of the hot-water storage tank 105. A hot-water supply tap and a hot-water discharge pipe 107 for supplying warm water to a bathtub and the like are coupled to the upper part of the hot-water storage tank 105, and a water supply pipe 108 is coupled to the bottom of the hot-water storage tank 105.

The heat pump type hot-water supply apparatus includes an outdoor unit 109 and an indoor unit 110. The outdoor unit 109 includes the heat exchanger 104 for a heat source and a blower 104a. The indoor unit 110 includes a refrigerant circuit appliance including the compressor 101, the water heat exchanger 102, and the expansion valve 103, and a hot-water supply circuit appliance including the hot-water storage tank 105 and the water circulation pump 106. Closing valves 111 are coupled to a port of the indoor unit 110, and pipe joints 112 are coupled to a port of the outdoor unit 109. The closing valves 111 and the pipe joints 112 are coupled to each other on-site through connecting pipes 113. The bite type pipe coupling structure according to the first embodiment is applied to the coupling portion of each connecting pipe 113. Specifically, the closing valve 60 according to the sixth embodiment is used for each closing valve 111, and the pipe joint according to the first embodiment is used for each pipe joint 112.

Further, the pipe joint is also used for the hot-water supply pipe. That is, the hot-water discharge pipe 107 is coupled to the upper part of the hot-water storage tank 105 through the pipe joint 115. The water supply pipe 108 is coupled to the bottom of the hot-water storage tank 105 through the pipe joint 115. The bite type pipe coupling structure according to the first embodiment is applied to each of the pipe joints 115 and specifically, the bite type pipe joint according to the first embodiment is used.

In the heat pump type hot-water supply apparatus according to the tenth embodiment, in a state where the refrigerant circuit is filled with a refrigerant such as carbon dioxide, a heat pump is operated by a supercritical refrigeration cycle and high temperature water for hot-water supply is thus obtained. In such a refrigerant circuit, since the pressure of the refrigerant increases, it is important to prevent the refrigerant from being leaked from the pipe coupling portion to which a pipe is coupled on-site. According to the present embodiment, since the closing valves 111 and the pipe joints 112 to which the bite type pipe coupling structure according to the first embodiment is applied are used, an apparatus having high reliability is obtained, and the workability when coupling a pipe on-site is improved. Further, since the pipe joints 115 to which the bite type pipe coupling structure according to the first embodiment is applied are used even in the pipe coupling structure of the hot-water supply circuit, an apparatus having much higher reliability is obtained, and the workability when coupling a pipe on-site is further improved. In the heat pump type hot-water supply apparatus, the heat exchanger for a heat source to be a low pressure is included in the independent outdoor unit 109. Therefore, the heat exchanger 104 for a heat source can be installed at an appropriate outdoor place while suppressing a heat loss to be small.

Eleventh Embodiment

Figure 25:
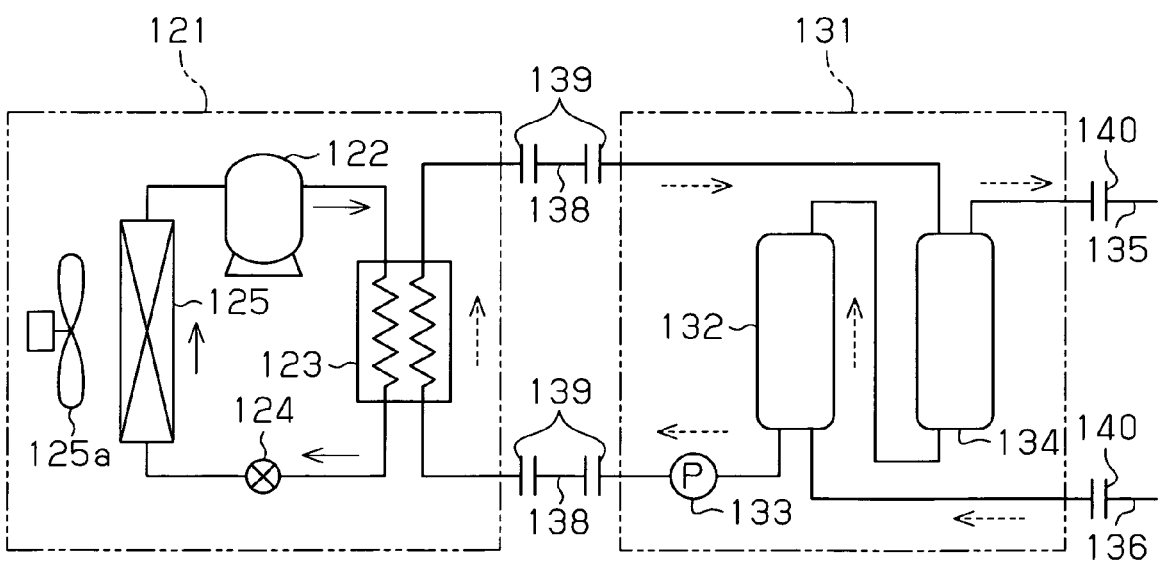
FIG. 25 is a schematic diagram of a refrigerating cycle apparatus according to an eleventh embodiment of the present invention.
Figure 26:
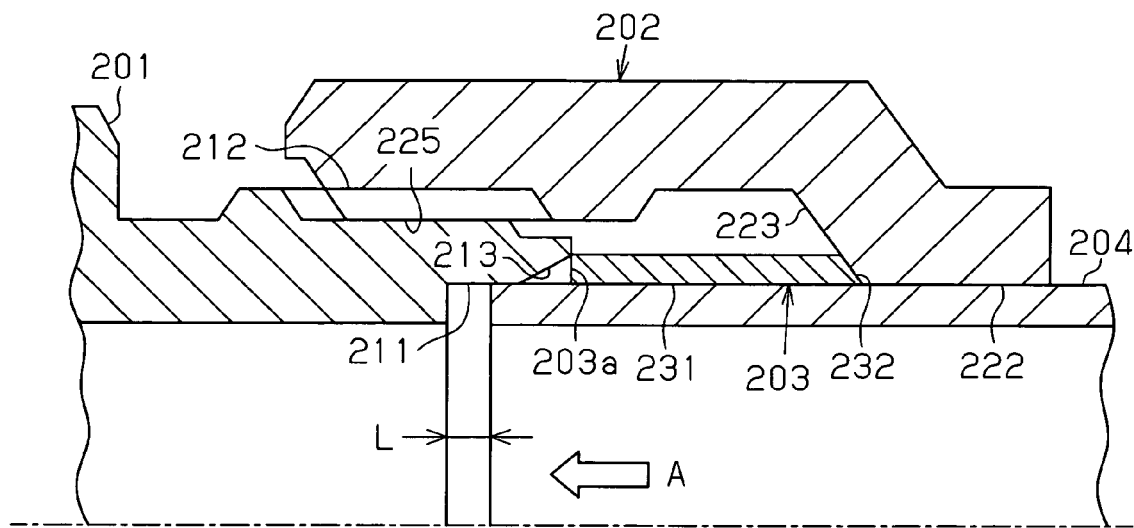
FIG. 26 is a partial cross-sectional view of a bite type pipe joint of a prior art, illustrating a state before fastening of a fastening nut to a joint main body is fully completed.
Figure 27:
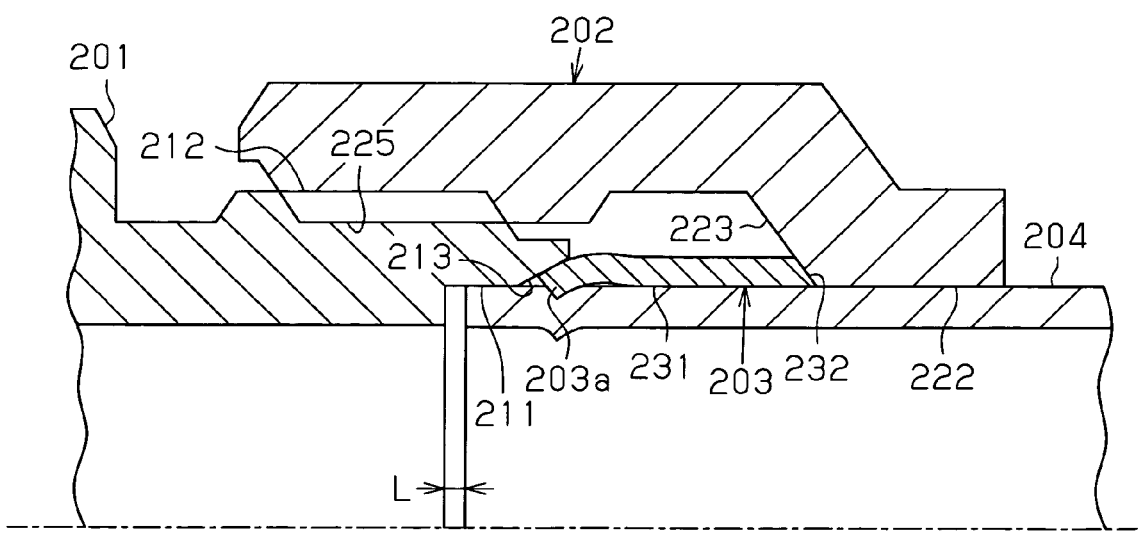
FIG. 27 is a partial cross-sectional view of the pipe joint of FIG. 26 illustrating a state after fastening of the fastening nut to the joint main body is fully completed.

Next, a refrigerating cycle apparatus according to an eleventh embodiment of the present invention is described with reference to FIG. 25. FIG. 25 shows the entire configuration of a heat pump type hot-water supply apparatus as a refrigerating cycle apparatus using a natural refrigerant such as carbon dioxide. The heat pump type hot-water supply apparatus of FIG. 25 is identical to the heat pump type hot-water supply apparatus of FIG. 24 in using condensation heat of a condenser constituting a refrigerating cycle as a heat source, however the heat pump type hot-water supply apparatus of FIG. 25 is different from the heat pump type hot-water supply apparatus of FIG. 24 in the configuration of a unit and in having a plurality of hot-water storage tanks.

The heat pump type hot-water supply apparatus of FIG. 25 has a heat source unit 121 and a hot-water storage unit 131. The heat source unit 121 includes a refrigerating cycle and has a refrigerant circuit in which a refrigerant circulates in a solid line arrow direction of FIG. 25. In the refrigerant circuit, a compressor 122, a water heat exchanger 123 for heating water for hot-water supply by radiating condensation heat of a refrigerant, an expansion valve 124, and a heat exchanger 125 for a heat source using external air as a heat source are disposed and coupled in this order. A blower 125a is provided in the heat exchanger 125 for a heat source. The refrigerant circuit is filled with a natural refrigerant such as carbon dioxide and is operated with a supercritical refrigeration cycle.

The hot-water storage unit 131 includes a hot-water supply circuit. In the hot-water supply circuit, as indicated by broken line arrows of FIG. 25, water for hot-water supply circulates in order through the bottom of a hot-water storage tank 132 of the upstream side, a water circulation pump 133, the water heat exchanger 123, an upper part of a hot-water storage tank 134 of the downstream side, the bottom of the hot-water storage tank 134 of the downstream side, an upper part of the hot-water storage tank 132 of the upstream side, and the bottom of the hot-water storage tank 132 of the upstream side. A hot-water discharge pipe 135 is coupled to the upper part of the hot-water storage tank 134 of the downstream side, and a water supply pipe 136 is coupled to the bottom of the hot-water storage tank 132 of the upstream side. Water for hot-water supply heated by the water heat exchanger 123 is transferred to the upper part of the hot-water storage tank 134 of the downstream side, and water of the bottom of the hot-water storage tank 132 of the upstream side is transferred to the water heat exchanger 123. As a result, high temperature water fills the upper part of the hot-water storage tank 134 of the downstream side and the bottom thereof, and then fills the hot-water storage tank 132 of the upstream side from the upper part to the bottom thereof. That is, at the start of an operation, high temperature water only fills the upper part of the hot-water storage tank 134 of the downstream side, and as an operating is continuously performed, high temperature water fills the bottom of the hot-water storage tank 134 of the downstream side, the upper part of the hot-water storage tank 132 of the upstream side, and the bottom of the hot-water storage tank 132 of the upstream side.

In the eleventh embodiment, each water distribution pipe 138 couples the hot-water storage unit 131 and the heat source unit 121 to each other through a pipe joint 139. Further, the hot-water discharge pipe 135 and the water supply pipe 136 are coupled to the hot-water storage tank 134 of the downstream side and the hot-water storage tank 132 of the upstream side through the pipe joint 140, respectively. In a pipe coupling portion of the pipe joints 139 and 140, the bite type pipe coupling structure according to the first embodiment is applied and specifically, the bite type pipe joint according to the first embodiment is used.

In the hot-water supply apparatus of the eleventh embodiment, similarly to the heat pump type hot-water supply apparatus according to the eleventh embodiment, a refrigerant such as carbon dioxide fills the refrigerant circuit, a heat pump is operated with a supercritical refrigeration cycle and thus high temperature water for hot-water supply is obtained. In the hot-water supply circuit, the pipe joints 139 and 140 having the bite type pipe coupling structure according to the first embodiment are used. Thereby, an apparatus of high reliability having less leakage of fluid is obtained, and the workability when coupling a pipe on-site is improved. Further, unlike the tenth embodiment, since a plurality of hot-water storage tanks are provided, a border area between a high temperature layer and a low temperature layer of water for hot-water supply decreases within each hot-water storage tank, so that thermal efficiency increases. Further, since the diameter of the hot-water storage tank is decreased, the installation space of the hot-water storage tank is decreased.

(Modification)

The above-described embodiments may be modified as follows.

Each of pipe coupling structures according to the second embodiment to the fifth embodiment may be applied to the different diameter pipe joint 70 of the seventh embodiment or the closing valve 60 of the sixth embodiment and may be applied to other pipe joints and valves. In this case, leakage from the pipe coupling portion is suppressed, and the workability of pipe coupling is improved.

In the eighth embodiment to the eleventh embodiment, a pipe joint or a valve such as a closing valve having a pipe coupling structure according to any one of the second embodiment to the fifth embodiment may be used in the pipe coupling portion. In this case, leakage from the pipe coupling portion is suppressed, and the workability of pipe coupling is improved.

In the second embodiment and the third embodiment, the bite type sleeve 3 formed as an independent part may be used as in the fifth embodiment.

In the eighth embodiment and the ninth embodiment, a refrigerant other than a HC refrigerant may be used. In the tenth embodiment and the eleventh embodiment, a refrigerant other than carbon dioxide may be used.

In the refrigerating cycle apparatus according to the eighth embodiment to the eleventh embodiment, the pipe coupling structure according to the first embodiment is applied only to the coupling portions to which pipes are coupled on-site, but may be applied even to the coupling portions within the apparatus. For example, in the tenth embodiment and the eleventh embodiment, in order to replace the hot-water storage tank 105, 132, 134, the bite type pipe joint having the bite type pipe coupling structure according to the first embodiment may be used for all pipes coupled to the hot-water storage tank 105, 132, 134.

A hot-water supply apparatus may be, for example, a gas fired hot-water supply apparatus or an electric water heater, rather than a heat pump type hot-water supply apparatus. A bite type pipe coupling structure according to the present invention may be applied to a water pipe used for the hot-water supply apparatus.

The invention claimed is:

1. A bite type pipe coupling structure characterized by:
   a joint main body having a pipe coupling port into which a coupling pipe is inserted;
   a tubular bite type sleeve fitted to an outer circumference of the coupling pipe; and
   a fastening member fastened to the joint main body so as to press the bite type sleeve toward the inside of the joint main body,
   wherein an outer circumferential surface of the bite type sleeve is a tapered outer circumferential surface, the diameter of which decreases toward the inside of the joint main body,
   wherein a guide tapered surface, the diameter of which increases toward the fastening member, is provided in a portion of the pipe coupling port that is adjacent to the fastening member, and the bite type sleeve can contact the guide tapered surface,
   wherein the guide tapered surface has a small diameter portion for guiding a distal end portion of the bite type sleeve to bite into the coupling pipe and a large diameter portion for sealing the tapered outer circumferential surface of the bite type sleeve by making close contact with the tapered outer circumferential surface,
   wherein a tilt angle of the small diameter portion relative to a central axis of the guide tapered surface is greater than that of the large diameter portion relative to the central axis, and
   wherein the bite type sleeve is formed integrally with the joint main body and is separated from the joint main body by an axial pressing force from the fastening member.

2. The bite type pipe coupling structure according to claim 1, characterized in that the guide tapered surface has an intermediate portion between the small diameter portion and the large diameter portion,
   wherein a tilt angle of the intermediate portion relative to the central axis is smaller than those of the small diameter portion and the large diameter portion.

3. The bite type pipe coupling structure according to claim 1 characterized in that the fastening member is a fastening nut screwed to the joint main body, wherein the bite type sleeve is joined to the pipe coupling port of the joint main body at a joint surface, which is substantially parallel to the central axis of the bite type sleeve, so that the bite type sleeve is formed integrally with the joint main body.

4. A pipe joint comprising at least two pipe coupling portions extended in different directions, the pipe joint being characterized in that the bite type pipe coupling structure according to claim 1 is used in at least one of the pipe coupling portions.

5. A pipe joint comprising two pipe coupling portions extended in different directions, the pipe joint being characterized in that the bite type pipe coupling structure according to claim 1 is used in one of the two pipe coupling portions, wherein a pipe is coupled to the other of the two pipe coupling portions by brazing.

6. A pipe joint comprising two pipe coupling portions extended in different directions, the pipe joint being characterized in that the bite type pipe coupling structure according to claim 1 is used in the two pipe coupling portions.

7. The pipe joint according to any one of claims 4 to 6, characterized in that coupling pipes having different diameters are coupled to pipe coupling portions extended in different directions.

8. A valve comprising at least one pipe coupling portion, the valve being characterized in that the bite type pipe coupling structure according to claim 1 is used in the pipe coupling portion.

9. A closing valve comprising at least one pipe coupling portion, the closing valve being characterized in that the bite type pipe coupling structure according to claim 1 is used in the pipe coupling portion.

10. A refrigerating cycle apparatus comprising a refrigerant circuit, wherein at least one pipe coupling portion to which a refrigerant pipe is detachably coupled is provided in the refrigerant circuit, the apparatus being characterized in that the bite type pipe coupling structure according to claim 1 is used in the pipe coupling portion.

11. The refrigerating cycle apparatus according to claim 10, characterized in that a refrigerant circulating in the refrigerant circuit is a high pressure gas refrigerant.

12. The refrigerating cycle apparatus according to claim 10, characterized in that a refrigerant circulating in the refrigerant circuit is a hydrocarbon refrigerant.

13. The refrigerating cycle apparatus according to any one of claims 10 to 12, characterized by being operated by a supercritical refrigeration cycle.

14. The refrigerating cycle apparatus according to claim 10, characterized in that the refrigerating cycle apparatus is a heat pump type hot-water supply apparatus.

15. A hot-water supply apparatus comprising a circuit in which water for hot-water supply circulates, the apparatus being characterized in that a pipe coupling portion using the bite type pipe coupling structure according to claim 1 is provided in the circuit.

16. A method of bite type pipe coupling of a pipe joint having a pipe coupling portion in which the bite type pipe coupling structure according to claim 1 is used, the method being characterized by:
   assembling the fastening member and the bite type sleeve in the coupling pipe and then inserting an end portion of the coupling pipe into the pipe coupling port of the joint main body;
   causing the distal end portion of the bite type sleeve to contact the guide tapered surface of the joint main body;

causing the distal end portion of the bite type sleeve to bite into the coupling pipe by fastening the fastening member; and causing the tapered outer circumferential surface of the bite type sleeve to make close contact with the guide tapered surface by pressing the tapered outer circumferential surface of the bite type sleeve against the guide tapered surface.

17. An on-site pipe coupling method characterized by performing a pipe construction on-site by applying the bite type pipe coupling method according to claim 16.

18. A bite type pipe coupling structure characterized by:
a joint main body having a pipe coupling port into which a coupling pipe is inserted;
a tubular bite type sleeve fitted to an outer circumference of the coupling pipe; and
a fastening member fastened to the joint main body so as to press the bite type sleeve toward the inside of the joint main body,
wherein an outer circumferential surface of the bite type sleeve is a tapered outer circumferential surface, the diameter of which decreases toward the inside of the joint main body,
wherein a guide tapered surface, the diameter of which increases toward the fastening member, is provided in a portion of the pipe coupling port that is adjacent to the fastening member, and the bite type sleeve can contact the guide tapered surface,
wherein the bite type sleeve has a distal end portion adjacent to the inside of the joint main body and a rear side portion far from the inside of the joint main body,
wherein a tilt angle of the tapered outer circumferential surface in the distal end portion relative to a central axis of the bite type sleeve is smaller than that of the guide tapered surface relative to a central axis of the guide tapered surface,
wherein a tilt angle of the tapered outer circumferential surface in the rear side portion relative to the central axis of the bite type sleeve is greater than that of the tapered outer circumferential surface in the distal end portion relative to the central axis of the bite type sleeve and is smaller than that of the guide tapered surface relative to the central axis of the guide tapered surface, and
wherein the outer diameter of the rear side portion is greater than the outer diameter of the distal end portion, and a step is provided between the distal end portion and the rear side portion such that a front end of the rear side portion has an outer diameter greater than that of a rear end of the distal end portion.

19. The bite type pipe coupling structure according to any one of claims 1 to 18, characterized in that the bite type sleeve is formed integrally with the fastening member, and before the bite type sleeve bites to the coupling pipe, the bite type sleeve is separated from the fastening member by an axial pressing force from the fastening member.

20. The bite type pipe coupling structure according to claim 19, characterized in that the fastening member is a fastening nut screwed to the joint main body, wherein the bite type sleeve is connected to an inner wall of the fastening nut through a thin connection to be formed integrally with the fastening nut.

* * * * *